US011194815B1

(12) United States Patent
Kumar et al.

(10) Patent No.: US 11,194,815 B1
(45) Date of Patent: Dec. 7, 2021

(54) CONSTRAINED QUERY EXECUTION

(71) Applicant: Amazon Technologies, Inc., Seattle, WA (US)

(72) Inventors: Ankit Kumar, Bellevue, WA (US); Alazel Acheson, Redmond, WA (US); Matthew William Berry, Seattle, WA (US); Ankul Rastogi, Redmond, WA (US); Amit Sahasrabudhe, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 16/273,006

(22) Filed: Feb. 11, 2019

(51) Int. Cl.
*G06F 16/2455* (2019.01)
*G06F 9/50* (2006.01)
*G06F 16/2453* (2019.01)
*G06F 16/9038* (2019.01)
*G06F 16/901* (2019.01)

(52) U.S. Cl.
CPC ........ *G06F 16/24565* (2019.01); *G06F 9/505* (2013.01); *G06F 16/24532* (2019.01); *G06F 16/24561* (2019.01); *G06F 16/9024* (2019.01); *G06F 16/9038* (2019.01)

(58) Field of Classification Search
None
See application file for complete search history.

(56) References Cited

U.S. PATENT DOCUMENTS

| | | | | |
|---|---|---|---|---|
| 10,459,915 | B2* | 10/2019 | Stanfill | G06F 16/24532 |
| 2003/0191795 | A1* | 10/2003 | Bernardin | G06F 9/505 718/105 |
| 2003/0225890 | A1* | 12/2003 | Dunstan | H04L 67/02 709/227 |
| 2005/0192997 | A1* | 9/2005 | Dettinger | G06F 16/217 |
| 2012/0096069 | A1* | 4/2012 | Chan | G06F 9/4856 709/203 |
| 2013/0103670 | A1* | 4/2013 | Kashyap | G06F 9/3885 707/714 |
| 2013/0185321 | A1* | 7/2013 | Ryu | G06F 16/24568 707/759 |
| 2015/0058858 | A1* | 2/2015 | Plattner | G06F 9/5038 718/103 |
| 2015/0067691 | A1* | 3/2015 | Johnson | G06F 9/5016 718/103 |

(Continued)

*Primary Examiner* — Uyen T Le
(74) *Attorney, Agent, or Firm* — Lee & Hayes, P.C.

(57) ABSTRACT

Service interruptions in a multi-tenancy, network-based storage system can be mitigated by constraining the execution of queries. In various examples, a network-based storage system may receive a request to execute a query against data maintained by the network-based storage system. The network-based storage system may perform a unit of work to execute the query, progressing through some, but not all, of a set of operations that are to be completed for completing execution of the query. Upon completion of the unit of work, query execution may be paused, query state data may be saved, and query results may be generated for consumption by the requesting computing device. In some embodiments, tokens that are usable to resume query execution based on the saved query state data may be sent to customer computing devices for resuming query execution on-demand.

21 Claims, 10 Drawing Sheets

(56) References Cited

U.S. PATENT DOCUMENTS

| | | | |
|---|---|---|---|
| 2015/0220352 A1* | 8/2015 | Wilson | H04L 67/10 |
| | | | 719/317 |
| 2015/0220611 A1* | 8/2015 | Farrar | G06F 16/21 |
| | | | 707/634 |
| 2017/0039245 A1* | 2/2017 | Wholey, III | G06F 16/9024 |
| 2017/0171049 A1* | 6/2017 | Kriegesmann | H04L 47/70 |
| 2019/0340284 A1* | 11/2019 | Kandukuri | G06F 16/24542 |

* cited by examiner

CONSTRAINED QUERY EXECUTION

BACKGROUND

Network-based storage services store data on behalf of customers so that the customers can later access their data on-demand. For example, customers can query the stored data at any time using application programming interfaces (APIs). Query workloads can vary depending on the type of query. For example, if the network-based storage service maintains test scores of students in a database, a query to lookup a single student's test score in a particular subject can be executed at a much lower workload than a query requesting to lookup every test score of an entire student body that has been recorded over the past three years. The latter query will have a much higher query workload and will consume a higher number of computing resources than the former query. In fact, some high-workload queries can include unbounded query patterns that can take days to complete. In a multi-tenancy architecture, multiple customers share computing resources, which means that customers may experience service interruptions (e.g., slow response times, failed queries, etc.) whenever their "noisy neighbors" execute high-workload queries that consume an inordinate amount of these shared computing resources. This can provide an inconsistent customer experience where system performance varies across multiple customers who are issuing queries of varied workloads.

The disclosure made herein is presented with respect to these and other considerations.

DETAILED DESCRIPTION

Figure 1:
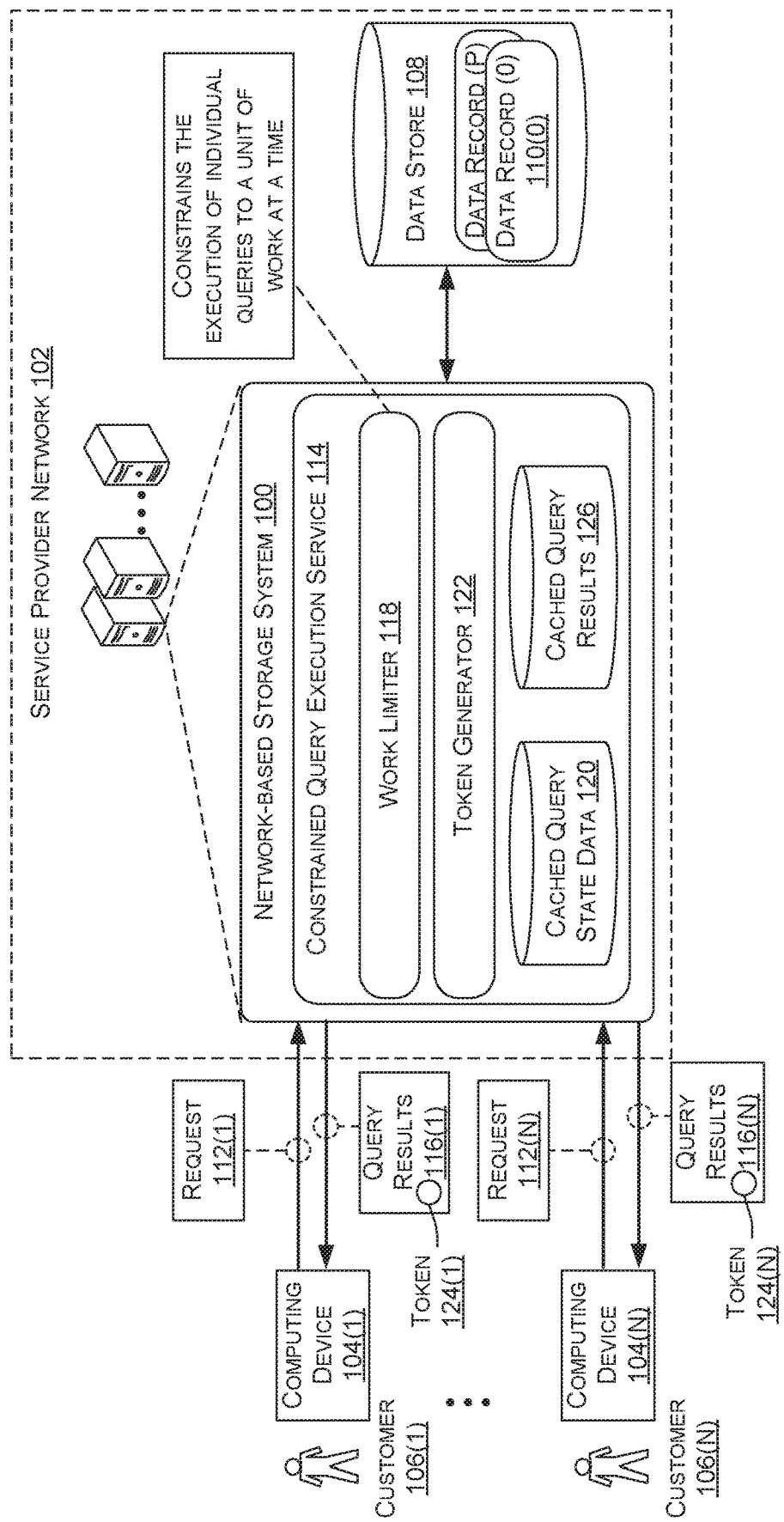
FIG. 1 is an architectural diagram showing a network-based storage system that is configured to constrain the execution of queries to a limited amount of work, which mitigates service interruptions in a multi-tenancy architecture.

Described herein are, among other things, techniques, devices, and systems for mitigating service interruptions in a multi-tenancy, network-based storage system by constraining the execution of queries. For example, customers of a network-based storage system can store data that is accessible on-demand by issuing queries to the network-based storage system. The network-based storage system disclosed herein receives a query execution request and performs a limited amount of work to execute the query. For instance, a query execution plan may set forth a set of operations that are to be performed to execute the query, whereby execution of the query is not finished until all of these operations are performed to completion. Accordingly, the network-based storage system disclosed herein is configured to limit query execution to a unit of work by progressing through some, but not all, of the set of operations set forth in the query execution plan. Upon the completion of the unit of work, the system pauses the execution of the query, which can be resumed at a later time. This can be contrasted with existing data storage systems that dedicate system resources to performing all of the work that is necessary to complete the execution of the query (i.e., existing storage systems progress all the way through the set of operations, without pausing, in order to return a complete answer to the customer).

The network-based storage system can save query state data indicative of a progress point within the set of operations up to the completion of a unit of work so that the execution of the query can be resumed by picking up from where the execution left off. Furthermore, when the execution of a query is paused, query results generated based on the execution of the query up to the completion of the unit of work can be sent to the requesting computing device. In order to resume execution of a query, the system can reference the saved query state data to determine the progress point, resuming query execution from that point. The system can execute a query in this fashion—by performing discrete units of work at a time, progressing further and further through the set of operations set forth in the query execution plan—until the execution of the query is complete. In other words, a query can be partitioned into multiple units of work, and the network-based storage system is configured to perform discrete units of work at a time on the query so that high-workload queries do not execute for long periods of time consuming an inordinately high amount of the available computing resources in the course of query execution.

By constraining query execution, as described herein, individual queries can be executed in units of work that are not prohibitively large to run at any given time, which mitigates service interruptions for customers of a multi-tenant storage system by conserving resources to make them available to the entire customer base. That is, the constrained query execution techniques described herein effectively throttle the consumption of computing resources to mitigate service interruptions for customers of a network-based storage system, which may be caused by unconstrained execution of queries that are otherwise prohibitively costly to execute, from a computing resource perspective. This, in turn, provides consistent performance (e.g., consistent query execution response times) across multiple queries of varied workloads. In this manner, customers are provided similar system performance, regardless of whether they request low-workload queries or high-workload queries.

Also disclosed herein are, among other things, techniques, devices, and systems for generating tokens that are usable, by customers, to resume query execution of a query whose execution has been paused. In some embodiments, these tokens may include "execution tokens" that contain the query state data sufficient for resuming execution of the query on any host computer(s) of the network-based storage system. For example, a customer can choose to resume query state by "replaying" the execution token back to the network-based storage system, whereby the network-based storage system can extract the query state data from the execution token to resume the execution of the query from the appropriate progress point. In some embodiments, tokens may include "representative tokens" that do not contain the query state data. These representative tokens may identify query state data that is saved elsewhere, such as in memory accessible to the network-based storage system. In this manner, representative tokens are smaller in size than execution tokens and can be sent to customer computing devices with reduced network bandwidth consumption, and memory resources on customer computing devices can be conserved by not having to store query state data, which can become large, depending on the complexity of the query. A benefit of using an execution token to send query state data to a customer computing device is that the network-based storage system does not have to dedicate storage to caching the query state data, which can become quite large considering a large customer base that may be issuing tens of thousands of queries per second.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is an architectural diagram showing a network-based storage system 100 that is configured to constrain the execution of queries to a limited amount of work, which mitigates service interruptions in a multi-tenancy architecture. A service provider network 102 may represent a computing network configured to provide computing resources (which might be referred to simply as "resources") on a permanent or an as-needed basis. Among other types of functionality, the computing resources provided by the service provider network 102 can be utilized to implement various types of network services. The computing resources provided by the service provider network 102 can include data processing resources, data storage resources, virtual machine ("VM") instances, networking resources, data communication resources, network services, and other types of computing resources.

The service provider network 102 can be accessed using an appropriate computing system, such as computing devices 104(1), . . . , 104(N) (collectively 104), to communicate with the service provider network 102 over an appropriate data communications network. In this way, customers 106(1), . . . , 106(N) (collectively 106) of the service provider network 102 can configure various aspects of the operation of the computing resources provided by the service provider network 102, or to otherwise control any computing resources being utilized by the customers 106. Thus, the service provider network 102 provides a multi-tenancy architecture, which serves multiple customers 106. Each customer 106 in a multi-tenancy architecture can be referred to as a "tenant." In this architecture, each tenant's data is isolated and is kept inaccessible to other tenants, yet the multiple tenants (customers 106) share the computing resources of the service provider network 102.

In an illustrative example, a computing device 104(1) can be utilized by customer 106(1) to purchase, and/or otherwise access, computing resources, such as storage containers that store data. The customer 106(1), using the computing device 104(1), may configure aspects of the operation of these computing resources, may access, update, and/or utilize data and functionality provided by the various services, tools, environments, and systems described herein, and/or perform other types of functionality with regard to the operation of these and other computing resources provided by the service provider network 102.

The computing devices that access the service provider network 102 (e.g. the computing devices 104) can be any type of computing device capable of connecting to the service provider network 102 via a suitable data communications network such as, but not limited to, a laptop or desktop computer, a tablet computing device, a server computer, or a smartphone. Administrative users employed by the owner or operator of the service provider network 102, such as administrators managing the operation of the service provider network 102, can also connect with, manage, and utilize resources provided by network services executing within the service provider network 102 in a similar fashion. Additional details regarding the configuration and operation of the service provider network 102 will be provided below with regard to FIGS. 8-11.

As discussed briefly above, the service provider network 102 can be configured to execute various types of network services. For example, and without limitation, the service provider network 102 can implement a storage service, which may be part of the network-based storage system 100. The storage service implemented by the network-based storage system 100 can store and maintain data in a data store 108 on behalf of customers 106 of the service provider network 102.

The network-based storage system 100 may provide and maintain data within the data store 108 in any suitable fashion, such as within logical storage units in the form of storage containers that are accessible to authorized computing devices 104 and/or authorized customers 106, and/or to VM instances provided by an on-demand computing service executing in the service provider network 102, and/or to other authorized computing devices. Again, each tenant's data is isolated and is kept inaccessible to other tenants, such as through the use of storage containers. FIG. 1 shows data records 110(0) through 110(P) (collectively 110, and sometimes referred to as "data 110"), which may be organized and/or managed in any suitable fashion. For instance, the data store 108 may represent a database, such as a graph database, a relational database, or any similar organizational data structure, including, without limitation, hierarchical data structures. A graph database comprises nodes representing data 110 and edges that connect the nodes.

A data record 110 (sometimes referred to as a "data object" 110) may include the data itself and possibly additional data or information about the data. For example, besides the data itself, a data record 110 may include, without limitation, a name (or key) of the data record 110, a version identifier (ID) of the data record 110, metadata (e.g., a time of creation of the data record 110, a size of the data record 110, a modification history of the data record 110, file type of the data record 110, encryption information of the data record 110, etc.), subresources, and access control information (e.g., an access policy), etc. Data records 110 are examples of "resources" that can be created and managed within the network-based storage system 110 on behalf of the customers 106. By maintaining customer's data 110 in the data store 108, remote access to the data 110 and/or other functionality is enabled for customers 106 utilizing associated computing devices 104 to remotely access the data 110.

Customers 106 may issue various types of requests 112 to the network-based storage system 100. For example, requests 112 received from customers 106 (or their computing devices 104) can include read requests (e.g., a GET request), write requests (e.g., a PUT request), copy requests, migration requests, delete requests, requests for metadata of data objects (e.g., HEAD request), or any other type of request relating to storage, retrieval, or modification of data 110 stored in the data store 108. In the context of the present disclosure, the requests 112 shown in FIG. 1 represent requests to execute queries against the data 110 stored in the data store 108. As such, FIG. 1 shows a first computing device 104(1) sending a first request 112(1), and an $N^{th}$ computing device 104(N) sending an $N^{th}$ request 112(N). In an example, these requests 112 may be sent using application programming interfaces (APIs) available to the computing devices 104. As such, the computing devices 104 can send the requests 112 to the network-based storage system 100 by making API calls. For example, if the data 110 includes data about students who are enrolled at a school, the computing devices 104 may utilize a "getStudentScore" API to access test scores associated with the students, and/or a "listStudents" API to access a list of student names, and similar APIs. The query associated with a given request 112 may be executed against the data 110 in order to access and/or update the data 110. Queries can be written in various languages that have a syntax to be parsed by the relevant components of the network-based storage system 100. In the context of the present disclosure, a constrained query execution service 114 is configured to receive and process incoming queries associated with requests 112. In some embodiments, an incoming query may be expressed in a graph query language used to specify the traversals of a graph database. These traversals can be composed of a set of operations.

In an illustrative example, the constrained query execution service 114 may receive a request 112 to execute a query against the data 110. The constrained query execution service 114 may parse the query to generate a representative form of the query that the service 114 can understand or process. In some embodiments, the service 114 may lookup customer information for the requesting customer 106, and may validate the request format or the requested data.

In order to execute the query against the data 110, the service 114 may create a query execution plan, which is comprised of a set of operations (or steps) that are to be completed for completing execution of the query. In some embodiments, these operations are to be completed in a particular order (or sequence) as a series of operations/steps. In some embodiments, the set of operations include nested operations such that a given operation (or step) may include multiple phases (or sub-operations). Any given operation may involve actions such as reading data 110 from the data store 108, transforming data 110 that was read from the data store 108, and/or writing data 110 to the data store 108. In some embodiments, operations of a query execution plan represent traversals of a database, such as the traversals of the edges of a graph database. The service 114 may, in some embodiments, optimize the query execution plan to generate an optimized query plan that is aimed at maximizing the efficiency of query execution. For example, operations in the set of operations can be re-ordered and/or combined to reduce the time, resource consumption, and/or the total number of operations performed during query execution. In some embodiments, the set of operations of a query execution plan may include as few as a single operation, or may include multiple operations. Query execution may include progressing through the set of operations (sometimes in a predetermined order or sequence) and generating query results 116 as the set of operations are performed. These query results 116 can be sent (e.g., returned) to the requesting computing devices 104. FIG. 1 shows first query results 116(1) sent to a first computing device 104(1) and $N^{th}$ query results 116(N) sent to an $N^{th}$ computing device 104(N).

As shown in FIG. 1, the constrained query execution service 114 may include a work limiter 118 that is configured to limit (or constrain) the work performed to execute individual queries to a unit of work at a time. A "unit of work" can be defined using any suitable metric. In an example, the unit of work can be defined in terms of time, whereby a unit of work is completed upon executing the query for a period of time. This period of time may be predetermined, or it may be dynamically determined on-the-fly based on any suitable parameter (e.g., time of day, current workload on the system 100, etc.). Said another way, units of work can represent "time slots" where one unit of work equals N time-based units of work (e.g., 1 unit of work=N milliseconds, seconds, minutes, etc.), N being any suitable number. Because this time period is a time when system resources are being utilized to execute the query, the time period can be expressed in terms of the time spent utilizing system resources (e.g., processing resources, memory resources, networking resources, etc.).

In another example, the unit of work can be defined in terms of processor cycles, whereby a unit of work is completed upon executing the query for a number of processor cycles. The number of processor cycles may be predetermined, or it may be dynamically determined on-the-fly based on any suitable parameter (e.g., time of day, current workload on the system 100, etc.). Accordingly, one unit of work may equal N processor cycles, N being any suitable number.

In another example, the unit of work can be defined in terms of the edges of a graph database, a graph database including nodes and edges connecting pairs of nodes. In this example, a unit of work is completed upon traversing a number of edges of a graph database during the execution of the query. The number of edges may be predetermined, or it may be dynamically determined on-the-fly based on any suitable parameter (e.g., time of day, current workload on the system 100, etc.). Accordingly, one unit of work may equal N traversed edges of a graph database, N being any suitable number.

In another example, the unit of work can be defined in terms of the pages of one or more files maintained in the data store 108. In this example, a unit of work is completed upon reading a number of pages of one or more files during the execution of the query. The number of pages may be predetermined, or it may be dynamically determined on-the-fly based on any suitable parameter (e.g., time of day, current workload on the system 100, etc.). Accordingly, one unit of work may equal N read pages of one or more files, N being any suitable number.

The unit of work can be defined using a function that is based on a combination of any two or more of the previous examples of a unit of work. For example, the unit of work can be defined in terms of time and processor cycles, whereby a unit of work is completed upon executing the query for a period of time or for a number of processor cycles, whichever occurs first. Furthermore, the number "N" in any of the previous examples of a unit of work can be determined by performing load tests and performance tests during query execution. Such tests can predict the system's 100 behavior which can then be tuned for a consistence performance across varying query workloads. Seeing as how workload can vary at any given moment, a value for the unit of work can be determined based on system resource utilization at the moment a query is to be executed. Accordingly, a function can be utilized to dynamically determine a value for the unit of work that is to be allocated to an incoming query based on any suitable parameter (e.g., using time of day as a heuristic, and/or the current workload on the system 100, etc.). In some embodiments, a weighted function can be used to dynamically compute a value for the unit of work that is to be allocated to an incoming query based on resource utilization, where individual types of resource are weighted independently (e.g., differently). For example, processing and/or networking resource consumption may be weighted higher than memory resource consumption. In this example, if processing and/or networking resource consumption is high when a query is to be executed, but memory resource consumption is low, the value for the unit of work (according to the weighted function) may computed as a lower value, as compared to a situation where processing and/or networking resource consumption is low when the query is to be executed. In general, during relatively idle times where workload on the system 100 is low, the work limiter 118 may dynamically determine a higher value for the unit of work. Conversely, the work limiter 118 may dynamically determine a lower value for the unit of work during a high activity time when the workload on the system 100 is high.

A given query may take 10 units of work, 100 units of work, or some other quantity of work units to complete. While some part of this work is deterministic in nature (e.g., authentication and authorization), some of the work to execute a query to completion may be indeterministic. This indeterministic work may depend on the query and its complexity. Thus, partitioning query execution into units of work is a suitable technique to constrain query execution to a limited amount of work for queries of such varied workloads.

As mentioned above, execution of the query against the data 110 may include progressing through a set of operations that are to be completed for completing execution of the query, as set forth in the query execution plan, until the unit of work is completed. Using the "time" example where the unit of work is defined as N units of time, the constrained query execution service 114 may perform a unit of work to execute the query by executing the query for a period of time (e.g., executing the query for N units of time, such as N milliseconds, seconds, minutes, etc.). Upon completion of the unit of work, the service 114 pauses (halts or suspends) the execution of the query.

To allow for resuming (or resurrecting) the execution of the query, the service 114 may save query state data indicative of the query state—a progress point within the set of operations up to the completion of the unit of work. For example, if a query execution plan includes a set of operations 0-N that are to be completed, and each operation involves reading data records 0-P, the query state data may indicate a progress point as: Operation: 2; Data Record: 6, which may indicate that Operation 1 was completed, and that Operation 2 was partially completed in that Data Records 1-5 were read before pausing query execution, but Data Records 6-P were not read before pausing query execution. Therefore, the query state data can indicate that query execution is to resume at Data Record 6 of Operation 2. Of course, this is merely an example, and the query state can be expressed in other ways. In any case, the query state data is sufficient for the service 114 to resume or resurrect the state of the query on any host computer that receives a subsequent request 112 to resume query execution. In some embodiments, query state data may further include query results data indicative of the query results that have been generated (and/or not generated) before pausing query execution.

The manner in which query state data is saved may vary and may take various factors into consideration. For example, query state data can be stored in memory (a storage location) accessible to the network-based storage system 100. This is shown as cached query state data 120 in FIG. 1. In taking this approach, the storage of such cached query state data 120 may be managed for optimization purposes, such as by re-distributing some of the cached query state data 120 amongst storage servers (e.g., load balancing), as well as setting expirations on the retention of such cached query state data 120. For instance, if a customer 106 starts executing a query, but never returns to resume execution of the query, the cached query state data 120 for that query may be discarded after an expiration period (e.g., a month since the last execution of the query, etc.).

FIG. 1 also shows a token generator 122, which may be configured to generate tokens 124 (e.g., token data) that are sent to requesting computing devices 104 (e.g., computing devices 104 that sent query execution requests 112). FIG. 1 shows a first token 124(1) sent to a first computing device 104(1) and an $N^{th}$ token 124(N) sent to an $N^{th}$ computing device 104(N). In some embodiments, these tokens 124 may comprise "execution tokens" that include (e.g., encode, carry, etc.) the query state data for a partially-executed query. When execution tokens are received by requesting computing devices 104, the execution tokens, and hence the query state data carried by the execution tokens, can be stored in local memory of the computing devices 104. Accordingly, "saving query state data" can include generating an execution token that includes the query state data and sending the execution token to the requesting computing device 104 for storage thereon. In some embodiments, when query state data is cached at the network-based storage system 100 as cached query state data 120, the query state data 120 may be stored in the form of execution tokens, which may include an identifier and possibly other data about the execution token.

Tokens 124 may additionally, or alternatively, comprise "representative tokens" that do not include the query state data, but which identify the query state data using an identifier. In these embodiments, the query state data can be stored in memory accessible to the network-based storage system 100 as cached query state data 120, and the representative token usable to identify the corresponding cached query state data 120 can be sent to a requesting computing device 104. If the cached query state data 120 is stored in the form of an execution token, the representative token can identify the execution token that is cached at the network-based storage system 100.

In order to resume execution of a partially-executed query, a computing device 104 may send the token 124 associated with that query to the network-based storage system 100 in a subsequent request 112. The constrained query execution service 114 may access the corresponding query state data using the received token 124. For example, if the received token 124 is an execution token that includes the query state data, accessing the query state data may involve extracting the query state data from the execution token. As another example, if the received token 124 is a representative token that does not carry the query state data, the service 114 may extract an identifier from the representative token and use the identifier to lookup the corresponding query state data amongst the cached query state data 120. The service 114 can then use the query state data to resume execution of the query from the progress point where the service 114 left off when the query was paused at an earlier time. Again, the work limiter 118 may limit the resumed execution of this query to an additional unit of work. Upon completion of this additional unit of work, the execution of the query may be paused for a second time, updated query state data may be saved, and additional query results 116 may be sent back to the requesting computing device 104. By limiting the work performed each time a query is executed, resource consumption can be conserved in order to mitigate service interruptions for customers 106 of the multi-tenant, network-based storage system 100.

FIG. 1 also shows cached query results 126, which represent query results 116 generated based on the execution of queries. These cached query results 126 can be cached in memory (a storage location) accessible to the network-based storage system 100. This may allow for avoiding re-execution of part of a query that has already been executed, and for which query results 116 have already been generated. For example, customers 106 may be able to share tokens 124 with each other, even if those tokens 124 have already been used by the sharing customer 106. In an example, if one customer 106(1) receives a shared token 124 usable to resume a query that was started by another customer 106(2), the customer 106(1) in possession of the shared token 124 may wish to resume the execution of the query, but may not possess the partial query results 116 that were generated previously. In this case, the constrained query execution service 114 may receive a request 112 to resume execution of a query, the request 112 including a token 124, and the service 114 may determine that partial query results 116 for this query have already been generated and are available in the cached query results 126. In this scenario, the service 114 may retrieve partial query results 116 from the cached query results 126 that correspond to the query instead of re-executing the query for a subset of operations that have already been performed for the other customer 106 who shared the token 124.

In another example, the service 114 may allow customers 106 to use already-used tokens 124 to rewind, or re-execute, queries for portions of the query that have already been executed. That is, if the customer 106 desires to re-execute part of a query, the customer's computing device 104 can send an earlier-used token 124 in order to cause the service 114 to re-execute a query from an earlier progress point (e.g., rewind the execution of query). This feature may be available for various reasons. For instance, updated data 110 may have been written to the data store 108 in the interim between executing the query the last time and the customer returning to resume execution of the query. As another example, the query results 116 received from the system 100 may be provided to a downstream service for further processing after receipt at the customer's computing device 104, and, if this downstream process fails to process the query results 116 for any reason, the customer 106 may wish to try again by re-generating the query results 116. To do this, the computing device 104 may send an already-used token 124 (i.e., a token 124 that was previously sent to the system 100 to resume the query), and the service 114 may re-execute the query from the progress point determined from the query state data. This effectively rewinds query execution to an earlier progress point, and the query results 116 generated may be different the second time around for various reasons. The data 110 may have changed in the interim, the workload on the system 100 may be lower or higher, which may cause the execution of the query to progress through more or less of the set of operations while performing the same unit of work as the last time, or the unit of work may be dynamically computed to a different value, as described elsewhere herein. In some embodiments, a single request 112 may include multiple tokens 124. In this manner, different portions of a query may be executed in parallel based on the respective tokens 124 included in the request 112.

Figure 2:
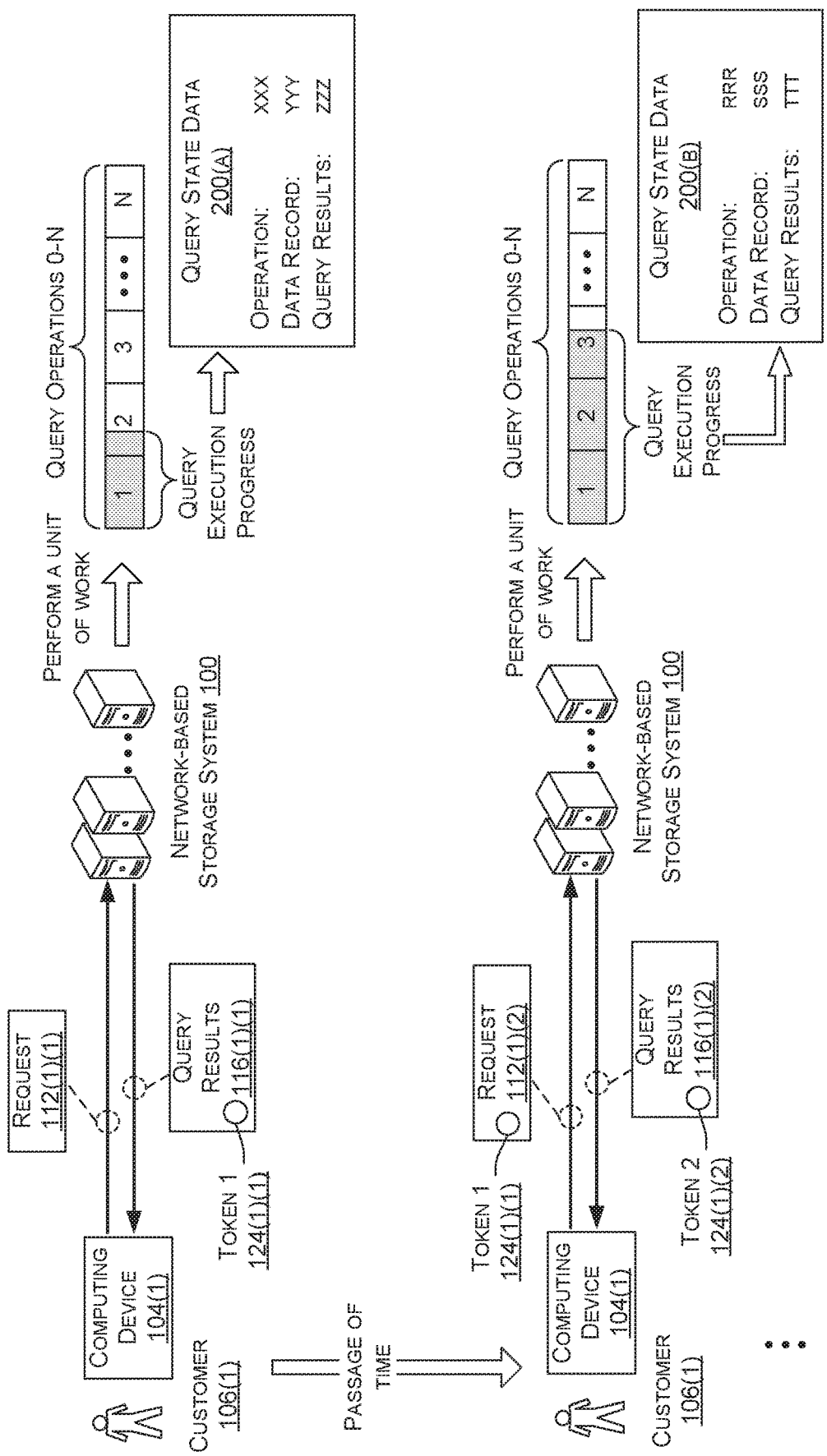
FIG. 2. is a schematic diagram illustrating an example technique for executing a query in discrete units of work at a time, saving query state data, and exchanging tokens that are usable to resume execution of a query based on the saved query state data.

FIG. 2 is a schematic diagram illustrating an example technique for executing a query in discrete units of work at a time, saving query state data, and exchanging tokens that are usable to resume execution of a query based on the saved query state data. In the example of FIG. 2, a customer 106(1), at a first time, may provide user input to the computing device 104(1) requesting to access and/or update data 110 maintained by the network-based storage system 100. Based on this user input, the computing device 104(1) may send a request 112 to the network-based storage system 100 to execute a query against the data 110. This request 112 may be in the form of an API call to the network-based storage system 100. In response to receiving the request 112, the constrained query execution service 114 of the network-based storage system 100 may start (or initiate) the execution of the query by progressing through a set of operations (query operations) 0-N that are to be completed for completing the execution of the query. The operations 0-N may represent a linear sequence of operations that can be performed using a single thread of execution. However, the operations 0-N may represent a set of operations, at least some of which can be executed/performed in parallel (e.g., parallel execution of multiple threads of execution). For example, Operation 2 and Operation 3, in the set of operations 0-N, may be performed in parallel during query execution. In fact, query execution plans can involve traversing operations in any suitable tree structure. In these arrangements, query execution may involve progressing through multiple branches of operations in parallel. The service 114 may use the work limiter 118 to constrain (or limit) the execution of the query to a unit of work, as described herein. Accordingly, the service 114 may perform a unit of work to execute the query, and upon completion of the unit of work, the service 114 may have progressed to a certain point within the set of operations 0-N. FIG. 2 shows that the service 114 performed Operation 1, and part of Operation 2 upon completion of the first unit of work. For example, if Operation 2 involves traversing through Data Records 0-P, and, upon completion of the unit of work, Data Records 0-5 were read from the data store 108, and Data Records 6-P were not read, the progress point may be specified as Data Record 6 (of the Data Records 0-P) within Operation 2 (of the Operations 0-N).

FIG. 2 shows an example of query state data 200(A) that may be saved to indicate the query execution progress (e.g., the progress point) within the set of operations 0-N up to the point of completing the unit of work. The query state data 200(A) may indicate which operations (e.g., operations "XXX") have been performed (or not performed), and/or which data records 110 (e.g., data records "YYY") have been accessed (or not accessed), and/or which query results (e.g., query results "ZZZ") have been generated (or not generated), up to the completion of the first unit of work. At a minimum, the query state data 200(A) includes data sufficient to resume or resurrect the query from the progress point where the service 114 left off when pausing the execution of the query. In some embodiments, the network-based storage system 100 may send partial query results 116(1) that have been generated up to the completion of the unit of work to the computing device 104(1). The system 100 may also send a token 124(1) to the computing device 104(1) that is usable to resume execution of the query. As mentioned above, this token 124(1) may be an execution token that includes the query state data 200(A), or it may be a representative token that identifies (or otherwise refers to) the query state data 200(A), or that identifies an execution token that includes the query state data 200(A).

In some embodiments, the token 124(1) is an execution token that includes the query state data 200(A). In these embodiments, the query state data 200(A) may be optimized, condensed, or otherwise compressed for minimizing the size of the data carried by the execution token, which data is ultimately stored on the computing device 104(1). For example, if a subset of the operations 0-N have not even been started at the point of pausing the execution of the query, the query state data 200(A), instead of listing out all of the operations that have not been performed, may save query state with data that is smaller in size by specifying a grouping of operations that have not been performed. A hierarchical organization of the operations 0-N may facilitate this data size optimization technique. For example, operations 0-N can be organized in multiple branches or groups that are performed in sequence, including a first branch/group with a first plurality of operations that are to be performed before a second branch/group with a second plurality of operations. In this scenario, if the progress point is somewhere within the first branch when the execution of the query is paused, the query state data 200(A)—instead of specifying each of the second plurality of operations in the query state data 200(A) with an indication that each operation has not been performed—can specify that the second branch has not been started, which may reduce the size of the query state data 200(A) in terms of the number of bytes of data, or any other unit of data size measurement. Other compression techniques known in the art may be utilized for compressing the query state data 200(A) to reduce its size before its transmission via a token 124(1), and/or before caching the query state data 200(A) in memory accessible to the network-based storage system 100 as cached query state data 120 with a smaller memory footprint.

FIG. 2 illustrates that the customer 106(1), at a second time that is subsequent to the first time, may wish to resume execution of the query. The customer 106(1) may provide user input to the computing device 104(1) for a second time, and the computing device 104(1) may send the token 124(1) as part of a request to resume execution of the query. The system 100 may receive the token 124(1) and may access the query state data 200(A) using the token 124(1) to determine the query state—the progress point. In the example of FIG. 2, the progress point indicated in the query state data 200(A) is a data record 110 within Operation 2. The service 114 may resume query execution from that progress point (e.g., from a data record 110 within Operation 2) by performing an additional unit of work to execute the query, whereby the services 114 progresses further through the set of operations 0-N while performing the additional unit of work. In the example of FIG. 2, the service 114 completes Operation 2 and part of Operation 3 up to the completion of the additional unit of work. The execution of the query is paused upon completion of the additional unit of work, and updated query state data 200(B) is saved to allow for resuming the execution of the query from the updated query state. The updated query state data 200(B) may indicate which operations (e.g., operations "RRR") have been performed (or not performed), and/or which data records 110 (e.g., data records "SSS") have been accessed (or not accessed), and/or which query results (e.g., query results "TTT") have been generated (or not generated), up to the completion of the first unit of work. For example, the updated query state data 200(B) may indicate an updated progress point (e.g., Data Record 20, of the Data Records 0-P, within Operation 3), and possibly query results data indicative of the additional query results 116(2) that were generated up to completion of this additional unit of work. The system 100 may send the additional query results 116(2) to the computing device 104(1). The system 100 may also send a second token 124(2) to the computing device 104(1) that is usable to resume execution of the query from the updated progress point specified in the updated query state data 200(B). It is to be appreciated that this process/technique may iterate until the customer 106 no longer wishes to resume the query, or until the query is complete (e.g., by completing operations 0-N). As mentioned above, query state data 200 may be saved for a limited amount of time, such that it is discarded after an expiration period. This may apply to tokens 124 as well, such that tokens 124 expire after an expiration period since the tokens 124 were generated. In this case, a computing device 104 may discard an expired token(s) 124 to free up memory. As indicated by the ellipses towards the bottom of FIG. 2, more than two round trips are possible in that the customer 106(1) may continually request to resume execution of the query (e.g., using tokens 124) for as long as it takes to complete execution of the query, or until the customer 106(1) decides to be finished.

In some embodiments, the service 114 may monitor the frequency that a token 124 is received from a particular customer 106, and, for customers 106 that return to resume queries above a threshold frequency, the service 114 may temporarily throttle the customer 106 to divert some system resources to other customers 106 who are executing their own queries. A HTTP-based 409 throttle or a 423 throttle may be used to throttle such a high-activity customer 106. In some embodiments, the service 114 may monitor the frequency that the service 114 is low on resources, and may add more capacity, as needed, based on this monitoring.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
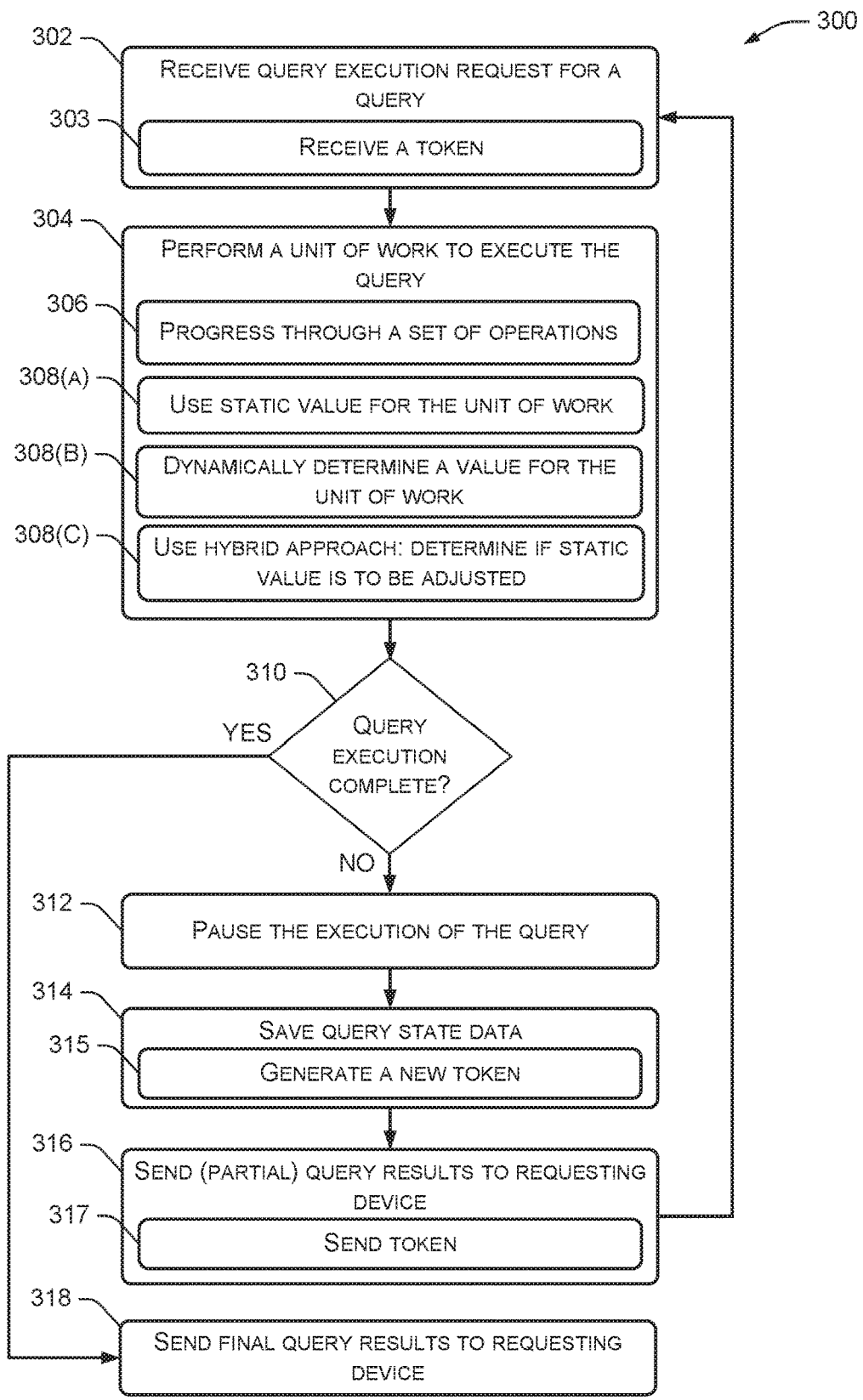
FIG. 3 is a flow diagram showing aspects of a process for constraining query execution by executing a query in discrete units of work at a time.

FIG. 3 is a flow diagram showing aspects of a process 300 for constraining query execution by executing a query in discrete units of work at a time. The process 300 is described, by way of example, with reference to the previous figures.

At 302, a network-based storage system 100 may receive, from a computing device 104 of a customer 106, a request 112 to execute a query against data 110 that is maintained by the network-based storage system 100. The computing device 104 may issue/make an API call in order to make the query, and the system 100 may receive the API call. The API call may be a result of a user providing user input to the computing device 104. The query may be to retrieve some of the data 110 and/or update some of the data 110. In an illustrative example, the data 110 may include test scores of students enrolled at a school, and the query may be a request to lookup the test scores of all students over the last three years.

As shown by sub-block 303, the request 112 received at block 302 may include a token 124, such as an execution token or a representative token, as described herein. If a request 112 includes a token, the request 112 is considered a request to resume the execution of a query that has already been partially executed.

At 304, a constrained query execution service 114 of the network-based storage system 100 may perform a unit of work to execute the query. Execution of the query may include, at sub-block 306, progressing through a set of operations (e.g., operations 0-N) that are to be completed for completing execution of the query. The service 114 may use a work limiter 118 to limit or constrain the execution of the query to a unit of work. For example, the service 114 may start the execution of the query by progressing through the set of operations that are to be completed for completing the execution of the query until a unit of work is completed. A unit of work may be completed upon executing the query for an allocated period of time, upon executing the query for an allocated number of processor cycles, upon traversing an allocated number of edges of a graph database during the execution of the query, upon reading an allocated number of pages of one or more files during the execution of the query, or the like. In some embodiments, the service 114 may partition query execution based on a smallest denomination of work, and after performing a single smallest denomination work, the work limiter 118 may determine whether the work performed so far equals the unit of work. If not, query execution continues until a number of smallest denominations equal to the unit of work is performed.

The unit of work performed at block 304 can be defined using any suitable metric, and, in some embodiments, the unit of work may be a predetermined value. For instance, as shown by sub-block 308(A), the work limiter 118 may use a static value for the unit of work. In this case, the static value may be the same value used for all customers 106 and/or all queries. In some embodiments, different static values can be designated for different types of customers 106 and/or different types of queries. However, as shown at sub-blocks 308(B) and 308(C), a value for the unit of work may be determined in other ways.

At sub-block 308(B), the work limiter 118 may dynamically determine a value for the unit of work on-the-fly based on a parameter value (e.g., time of day, current workload on the system 100, etc.). For instance, prior to performing the unit of work, the work limiter 118 may determine the time of day at which the request 112 is received at block 302, and if the time of day is within a particular range of times (e.g., 2:00 AM-4:00 AM), which typically may be a low activity time of day in terms of the workload on the system 100, the work limiter 118 may determine (or set) the value for the unit of work at a relatively high value to allow the query to execute longer, for more processor cycles, to traverse more edges of a graph database, or to read more pages of files before pausing execution of the query. By contrast, if the time of day is outside of the particular range (e.g., 10:00 AM), which typically may be a high activity time of day in terms of the workload on the system 100, the work limiter 118 may determine (or set) the value of the unit of work to a relatively low value to constrain the execution of the query to a shorter period of time, to a fewer number of processor cycles, to traverse fewer edges of a graph database, or to read fewer pages of files before pausing execution of the query. As another example, the work limiter 118 may determine a current workload of the network-based storage system 100 (e.g., a percentage of processor resource utilization, and/or percentage of network resource utilization, and/or percentage of memory resource utilization, etc.) at a time at which the request 112 is received at block 302, and if the current workload is low (e.g., if a percentage of system resource utilization is less than a threshold percentage), the work limiter 118 may determine (or set) the value for the unit of work at a relatively high value. By contrast, if the current workload on the system 100 is high (e.g., if a percentage of system resource utilization exceeds a threshold percentage), the work limiter 118 may determine (or set) the value of the unit of work to a relatively low value. In some embodiments, a static value for the unit of work may be used as a fallback in instances where the value for the unit of work cannot be dynamically determined. For example, if the current workload on the system 100 is unattainable at the moment, or is otherwise unresolvable, a default or static value for the unit of work can be utilized in that event.

At sub-block 308(C), the work limiter 118 may use a hybrid approach to determine the value of the unit of work. That is, the work limiter 118 may start with a static value for the unit of work, and the work limiter 118 may query a system (e.g., an external authority) to determine whether the static value is to be adjusted (e.g., up or down). The system that the work limiter 118 queries to make this determination may determine to adjust the static value based on any suitable factor(s), such as based on the type of customer 106, and/or based on the type of query, and/or based on the customer's recent behavior (e.g., whether the customer 106 has recently been bombarding the system 100 with a high amount of network traffic, based on a status of the customer's financial payments to a service provider of the system 100), and/or based on the current workload on the system 100 (e.g., availability of system resources), and/or based on the time of day, etc. In some embodiments, a combinatorial approach can be used to determine which approach to use for a given query execution request 112—static, dynamic, or hybrid. This determination can be based on any suitable heuristic.

At 310, a determination is made as to whether query execution is complete, meaning that all of the prescribed operations have been performed to completion. If one or more of the operations was not completed after performing the unit of work at block 304, the process 300 may follow the "NO" route from block 310 to block 312.

At 312, the service 114 may pause the execution of the query based at least in part on (e.g., in response to) completion of the unit of work at block 304 without having performed all of the operations to complete the execution of the query. Pausing query execution at block 312 may include ceasing to progress any further through the set of operations after completing the unit of work.

At 314, the service 114 may save query state data 200 indicative of a progress point within the set of operations up to the completion of the unit of work. The query state data may specify, for example, the operations that have been performed (or not performed), and/or the data records 110 that have been accessed (or not accessed), and/or the query results 116 that have been generated (or not generated) up to the point of pausing query execution at block 312. As described elsewhere herein, saving the query state data 200 at block 314 can be accomplished in various ways. In some embodiments, as shown by sub-block 315, in order to save query state data that is usable to resume execution of a paused query, the token generator 122 of the network-based storage system 100 may generate a token 124 (which is a new token 124, different from the token 124 received at sub-block 303). This token 124 may be an execution token that includes the query state data 200 sufficient to resume the execution of the query at a later time, or a representative token that identifies query state data 200 cached at a storage location accessible to the network-based storage system 100.

At 316, the network-based storage system 100 may send, to the computing device 104 of the customer 106, query results 116 generated based on the execution of the query up to the completion of the unit of work. These query results 116 may be partial query results 116 if the execution of the query has not completed. In some embodiments, partial query results may not be sent to the requesting computing device 104. For example, partial query results may be aggregated and maintained until a final disposition of the query, such as upon completing the execution of the query, in which case the query results may be sent in batch to the computing device 104 at the completion of query execution. In some embodiments, as shown by sub-block 317, the network-based storage system 100 may send a token 124 generated at sub-block 315 to the requesting computing device 104 of the customer 106. The token 124 may be sent at sub-block 317 along with the partial query results 116 generated up to the point of pausing the query execution. As shown by the arrow from block 316 to block 302, the process 300 may iterate blocks 302-316 for subsequent instances where the service 114 receives a query execution request 112 and performs an additional unit of work to execute the query, thereby generating additional query results. In embodiments that do not utilize tokens 124, the service 114 may identify cached query state data 120 using a client identifier. In some embodiments, identifying cached query state data 120 in this manner may involve querying an ephemeral service endpoint that identifies a particular query that the requesting customer 106 would like to resume. In embodiments that utilize tokens 124, a token 124 may or may not be received at sub-block 303 on any subsequent iteration of blocks 302-316. For example, the service 114 may identify a representative token based on a client identifier, and the service 114 may then use the representative token to identify cached query state data 120 for the requesting customer 106. In other embodiments, a token 124 may be received from the customer's computing device 104 at block 302, and this token 120 is usable to identify and retrieve query state data to resume execution of the query from the appropriate progress point.

Returning with reference to block 310, if the execution of the query has completed at block 310, meaning that the entire set of operations have been performed to completion, the process 300 may follow the "YES" route from block 310 to block 318, where the network-based storage system 100 may send, to the computing device 104 of the customer 106, final query results 116 generated based on the execution of the query up to the completion (or partial completion) of the final unit of work.

Figure 4:
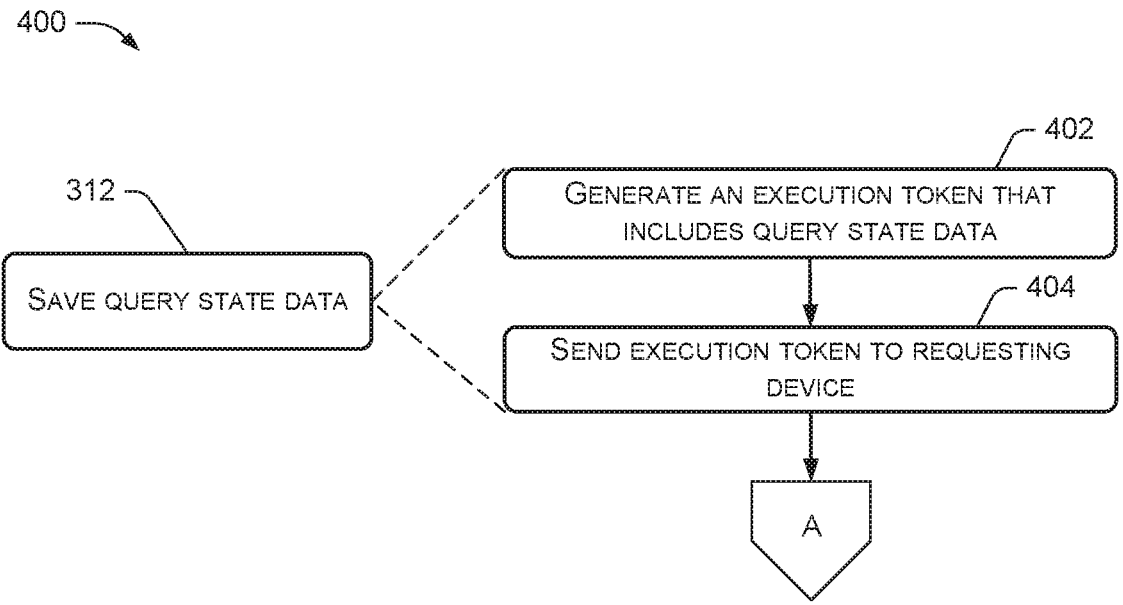
FIG. 4 is a flow diagram showing aspects of a process for saving query state data by generating an execution token that includes the query state data and sending the execution token to a requesting computing device.

FIG. 4 is a flow diagram showing aspects of a process 400 for saving query state data 200 by generating an execution token that includes the query state data 200 and sending the execution token to a requesting computing device 104. The process 400 is described, by way of example, with reference to the previous figures, and may represent a sub-process of block 312 of the process 300.

At 402, in order to save query state data that is used to resume execution of a paused query, the token generator 122 of the network-based storage system 100 may generate an execution token that includes the query state data 200 sufficient to resume the execution of the query at a later time. As described elsewhere herein, this may include encoding the query state data 200 to be transmitted via the execution token to the computing device 104. Encoding may include serializing the query state data. The query state data 200 may be optimized for transmission over a computer network, and/or to consume a smaller memory footprint when stored on the computing device 104. This may include grouping operations that have not been performed together and specifying that the group of operations have not been performed, rather than specifying each operation that has not been performed in the query state data 200. Other techniques may include compressing the query state data 200 to reduce the amount of data transmitted and/or stored.

At 404, the network-based storage system 100 may send the execution token to the computing device 104 of the customer 106. The execution token may be sent at block 404 along with the partial query results 116 generated up to the point of pausing the query execution.

Because query state is also dependent on query size, execution tokens can become quite large. Thus, the network-based storage system 100 may determine parameters of a requested query indicative of the complexity and/or size of the query, and, if the system 100 determines that the query state data 200 cannot be serialized in an execution token because it is too large and/or complex, the system 100 may be configured to return an error to customer 106 (e.g., QueryTooLargeException) in those instances.

Figure 5:
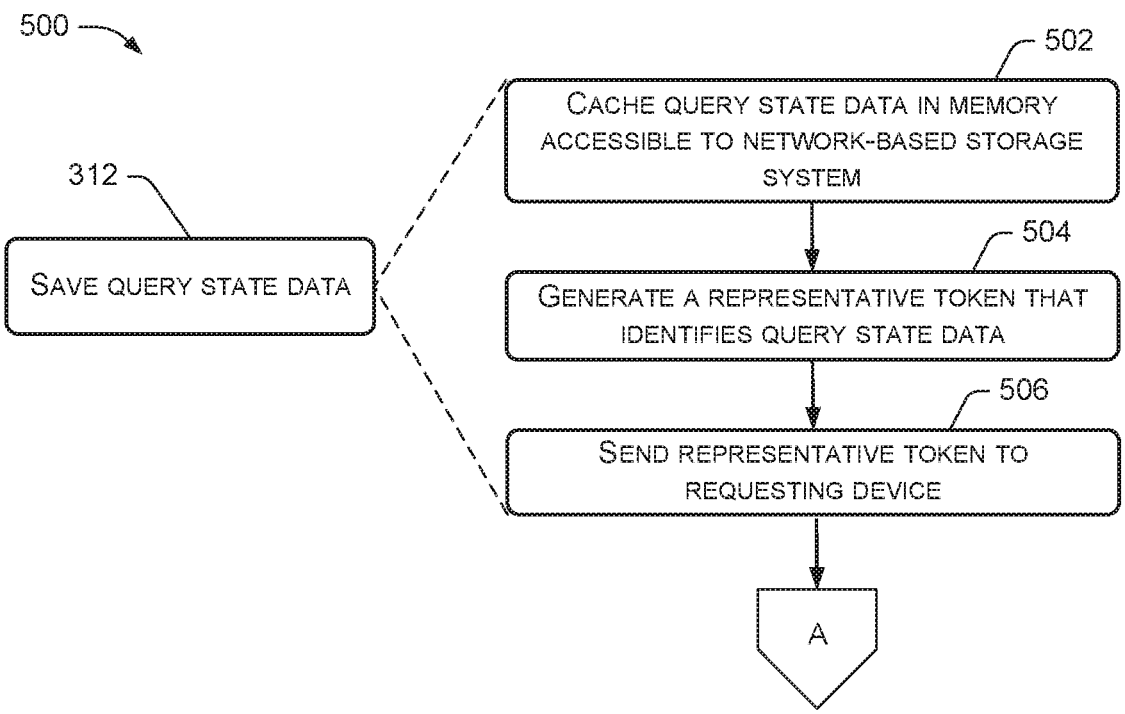
FIG. 5 is a flow diagram showing aspects of a process for saving query state data by caching the query state data in memory accessible to the network-based storage system.

FIG. 5 is a flow diagram showing aspects of a process 500 for saving query state data 200 by caching the query state data 200 in memory accessible to the network-based storage system 100. The process 500 is described, by way of example, with reference to the previous figures, and may represent a sub-process of block 312 of the process 300.

At 502, in order to save query state data that is used to resume execution of a paused query, the service 114 may store the query state data 200 in memory (a storage location) accessible to the network-based storage system 100. For example, the memory accessible to the system 100 may include one or more storage servers of the system 100, or even a remote system (e.g., an intermediate service interposed between the customer 106 and the system 100) that is accessible to the system 100 over a network. In an illustrative example, an intermedia service may utilize the network-based storage system 100 as its data store, such as to store data about students enrolled in a school. In this example, the intermediate service may provide APIs to its customers, such as a getStudentScore API, a listStudents API, etc. If a customer calls listStudents API, the intermediate service may execute an "expensive" or high-workload query on the system 100. As discussed elsewhere herein, the service 114 running on the system 100 may constrain the execution of the query to a unit of work, and may return an execution token to the intermediate service. Instead of sending this execution token to its customer, the intermediate service may cache the execution token locally at the intermediate service, and may send a smaller-size representative token to the customer, which is usable to resume the execution of the query so that the customer can retrieve additional student data records. Specifically, the intermediate service can use an identifier carried by the representative token to look up the execution token in its cache, and may use the query state data from the execution token to query the system 100 for additional data records. This allows the intermediate service to isolate its customers from varying execution token lengths. It also permits the intermediate service to change its backend data storage services without any impact on customers. In some embodiments, caching the query state data 200 at block 502 includes generating an execution token that includes the query state data 200, and caching the execution token at the system 100 by storing the execution token in the memory (a storage location) accessible to the system 100.

At 504, the token generator 122 of the network-based storage system 100 may generate a representative token that identifies the query state data 200 sufficient to resume the execution of the query at a later time. Thus, the representative token may not include the query state data 200, and, therefore, the representative token may be smaller in size than an execution token that includes or otherwise carries the query state data 200.

At 506, the network-based storage system 100 may send the representative token to the computing device 104 of the customer 106. The representative token may be sent at block 506 along with the partial query results 116 generated up to the point of pausing the query execution.

Figure 6:
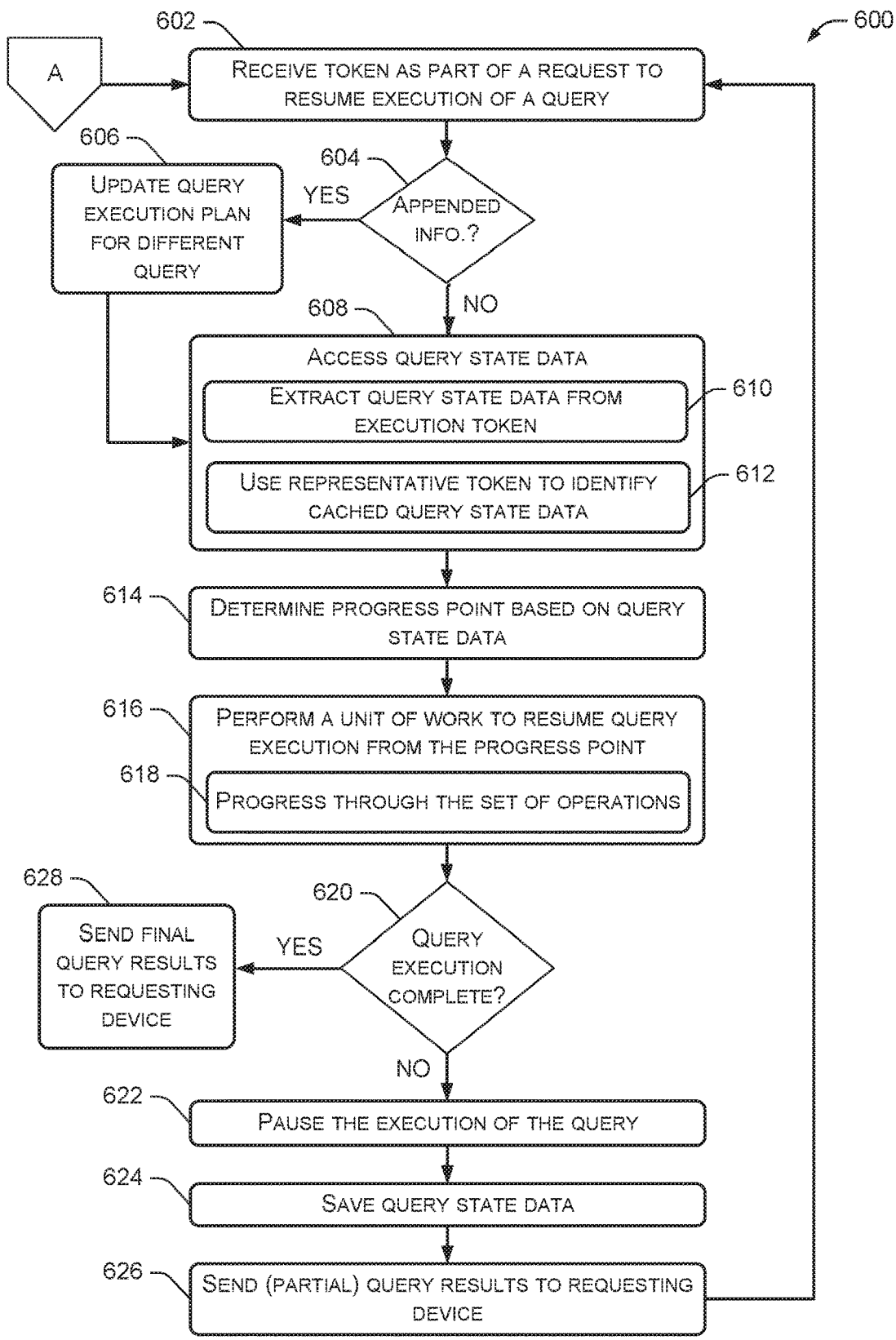
FIG. 6 is a flow diagram showing aspects of a process for resuming execution of a query based on receipt of a token from a requesting computing device.

FIG. 6 is a flow diagram showing aspects of a process 600 for resuming execution of a query based on receipt of a token 124 from a requesting computing device 104. The process 600 is described, by way of example, with reference to the previous figures, and may continue from the process 400 or the process 500, as shown by the off-page reference "A" in FIGS. 4, 5, and 6. That is, the process 600 starts from the notion that a customer's computing device 104 has already received a token 124, such as an execution token or a representative token, as described herein.

At 602, the network-based storage system 100 may receive, from a requesting computing device 104, a (second) request 112 to resume the execution of a query that has already been partially executed. The (second) request 112 received at block 602 may include a token 124, such as an execution token or a representative token, as described herein.

At 604, the system 100 may determine whether the (second) request 112 includes any appended information appended to the original query to create a different query. For instance, a customer 106 might append additional information, which might augment and/or change the original query in some fashion, such as to retrieve some additional data 110 that was not specified in the original query. The ability to append information to a query may be limited by the amount of information that can be appended, or by other factors (e.g., how much of the query has already been executed). If appended information is detected at block 604, the process 600 may follow the "YES" route from block 604 to block 606.

At 606, the service 114 may generate an updated query execution plan for the different query based on the appended information received in the request 112. This updated query execution plan may include a different set of operations that are to be completed for completing execution of the different query, as compared to the original set of operations for completing the original query.

At 608, following either block 606 or a determination at block 604 that the request 112 does not include appended information changing the original query (i.e., following the "NO" route from block 604), the service 114 may access the query state data 200 for the query that is to be resumed using the token 124 to determine the progress point. As shown by sub-blocks 610 and 612 of block 608, this may involve different operations depending on the type of token 124 received at block 602.

At 610, if the token 124 received at block 602 is an execution token that includes the query state data 200, accessing the query state data may include extracting the query state data 200 from the execution token. In some embodiments, this may include decoding encoded query state data.

At 612, if the token 124 received at block 602 is a representative token that does not include, but identifies, the query state data 200, accessing the query state data may include using the representative token to identify the query state data 200 within the memory (storage location) accessible to the network-based storage system 100.

At 614, once the query state data 200 has been accessed (e.g., identified using the representative token, or extracted from the execution token), the service 114 may determine the progress point based on the query state data 200. This progress point indicates where the service 114 left off in the course of executing the query last time before pausing the execution of the query.

At 616, the service 114 may perform an additional unit of work to execute the query from the progress point determined at block 614. Execution of the query may include, at 618, progressing further through the set of operations (or a different set of operations, if appended information was received in the request 112 at block 602) that are to be completed for completing execution of the query. The service 114 may use a work limiter 118 to, again, limit or constrain the execution of the query to another unit of work.

At 620, a determination is made as to whether query execution is complete, meaning that all of the prescribed operations have been performed to completion. If one or more of the operations was not completed after performing the additional unit of work at block 616, the process 600 may follow the "NO" route from block 620 to block 622.

At 622, the service 114 may pause the execution of the query based at least in part on (e.g., in response to) completion of the additional unit of work at block 616 without having performed all of the operations to complete the execution of the query. Pausing query execution at block 622 may include ceasing to progress any further through the set of operations after completing the additional unit of work.

At 624, the service 114 may save updated query state data 200 indicative of an updated progress point within the set of operations (or the different set of operations, if appended information was received in the request 112 at block 602) up to the completion of the additional unit of work. As described elsewhere herein, saving the query state data 200 at block 624 can be accomplished in various ways, such as with the process 400 or the process 500.

At 626, the network-based storage system 100 may send, to the computing device 104 of the customer 106, query results 116 generated based on the continued execution of the query up to the completion of the additional unit of work. These query results 116 may be partial query results 116 if the execution of the query has not completed. As shown by the arrow from block 626 to block 602, the process 600 may iterate blocks 602-626 for subsequent instances where the service 114 receives a query execution request 112 with a token 124, and performs an additional unit of work to resume execution of the query, thereby generating additional query results.

Returning with reference to block 620, if the execution of the query has completed at block 620, meaning that the entire set of operations have been performed to completion, the process 600 may follow the "YES" route from block 620 to block 628, where the network-based storage system 100 may send, to the computing device 104 of the customer 106, final query results 116 generated based on the execution of the query up to the completion (or partial completion) of the final unit of work.

Figure 7:
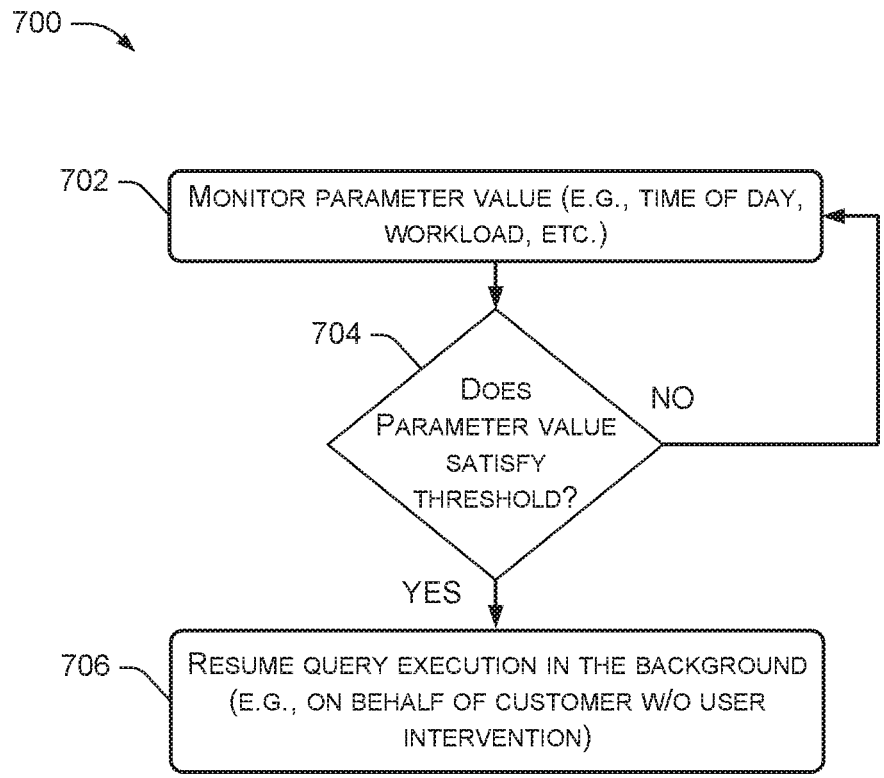
FIG. 7 is a flow diagram showing aspects of a process for executing a query in the background on behalf of a customer if a parameter value satisfies a threshold.

FIG. 7 is a flow diagram showing aspects of a process 700 for executing a query in the background on behalf of a customer 106 if a parameter value satisfies a threshold. The process 700 is described, by way of example, with reference to the previous figures.

At 702, after having partially executed a query, a constrained query execution service 114 of a network-based storage system 100 may monitor a parameter value. This parameter value may be, for example, a time of day, a current workload of the network-based storage system 100, or another parameter value.

At 704, the service 114 may determine whether the parameter value satisfies a threshold. The parameter value may satisfy the threshold at block 704 if the time of day is within a particular range of times (e.g., 2:00 AM-4:00 AM)—which typically may be a low activity time of day in terms of the workload on the system 100, or if the current workload of the system 100 is less than a threshold workload (e.g., if a percentage of processor and/or network, and/or memory resource utilization is less than a threshold percentage). If the threshold is satisfied at block 704, the service 114 may determine to resume the execution of the query, without user intervention (i.e., in the background), based at on the parameter value satisfying the threshold. In this case, the process 700 follow the "YES" route from block 704 to block 706.

At 706, the service 114 may resume the execution of the query in the background (e.g., on behalf of the customer 106, without user intervention). Query execution can be resumed from the progress point where the service 114 left off after pausing the query the last time it was executed. To determine the progress point, the service 114 may access the query state data 200, for example by accessing the query state data from the cached query state data 120 accessible to the system 100. Resuming the execution of the query at block 706 may generate additional query results 116, and these additional query results 116 can be sent to a computing device 104 of the customer 106. Because the query was resumed in the background, sending the additional query results 116 may occur as a push notification to the customer's computing device 104, or the service 114 may use a pull-based approach by waiting for the customer 106 to request to resume execution of the query, and, in response, sending the additional query results 116 that were generated in the background.

The process 700 allows for the service 114 to monitor periods of low activity on the system 100, and to take advantage of the available system resources by resuming execution of queries in the background on behalf of customers 106. The service 114 may obtain customer 106 authorization or permission before resuming query execution in the background for any given customer 106. For example, the customer 106 may provide a blanket authorization for the service 114 to resume query execution on behalf of the customer 106 during low activity periods. If a customer 106 does not wish to invoke such a feature, the customer 106 can specify that they want the service 114 to wait for each request 112 before resuming execution of the query. In some embodiments, machine learning models can be used to predict customers 106 who are likely to return to resume execution of their queries, and/or to predict when (e.g., times of day) when those customers 106 will return, and the automated background query execution using the process 700 may be performed for such customers 106 (e.g., in advance of a predicted return time).

Figure 8:
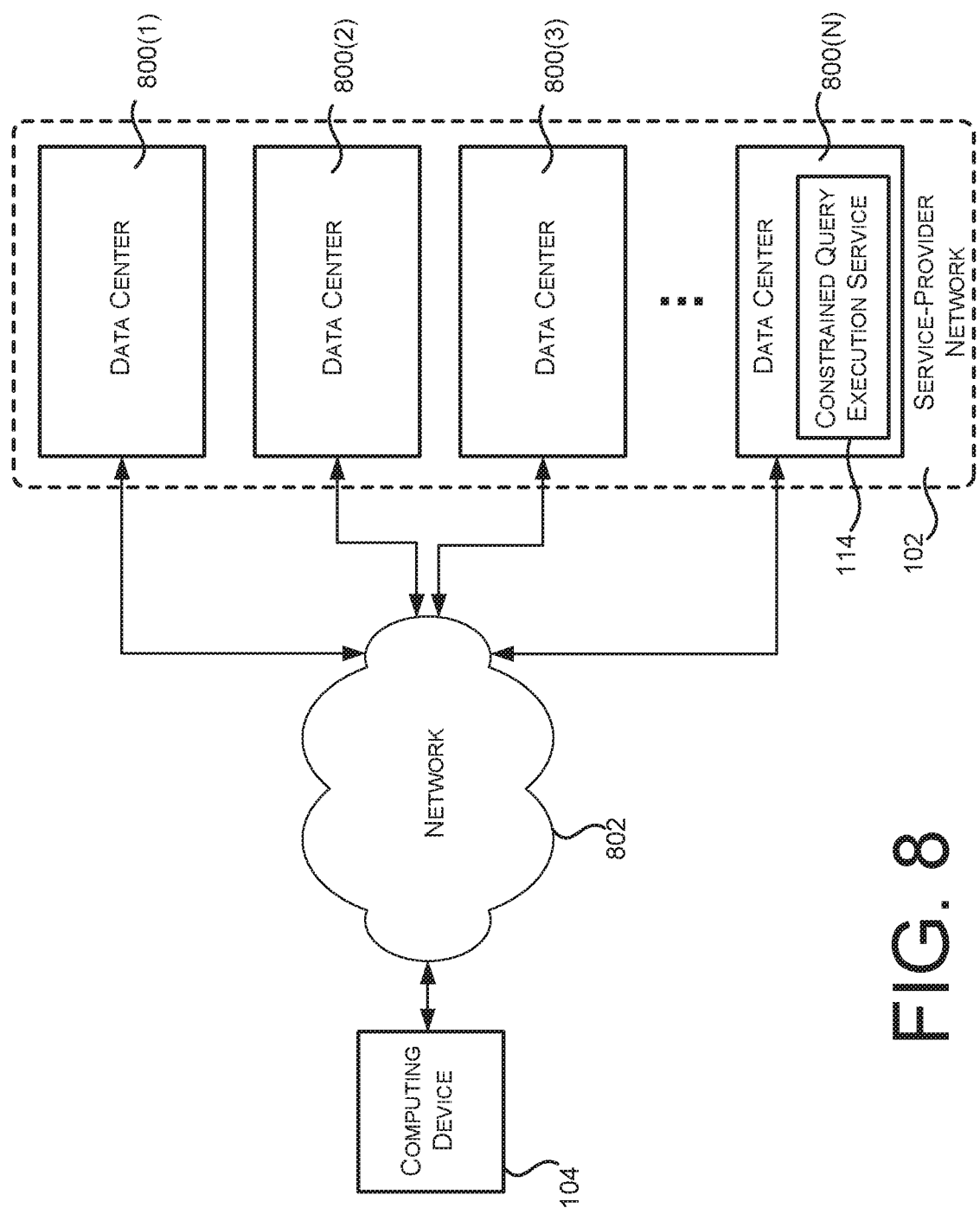
FIG. 8 is a system and network diagram that shows an illustrative operating environment that includes a service provider network that can be configured to implement aspects of the functionality described herein.

FIG. 8 is a system and network diagram that shows one illustrative operating environment for the configurations disclosed herein that includes a service provider network 102 that can be configured to execute a service of the network-based storage system 100, such as the constrained query execution service 114, and the other network services described herein, according to one particular configuration. As discussed briefly above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data storage resources, data processing resources, such as VM instances, networking resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 are enabled in one implementation by one or more data centers 800(1)-(N) (collectively 800). The data centers 800 are facilities utilized to house and operate computer systems and associated components. The data centers 800 typically include redundant and backup power, communications, cooling, and security systems. The data centers 800 can also be located in geographically disparate locations. One illustrative configuration for a data center 800 that can be utilized to implement the technologies disclosed herein will be described below with regard to FIG. 9. For example, the data center 800(N) is shown as implementing the constrained query execution service 114 described herein.

The customers 106 of the service provider network 102 can access the computing resources provided by the service provider network 102 over a network 802, which can be a wide area communication network ("WAN"), such as the Internet, an intranet or an Internet service provider ("ISP") network or a combination of such networks. For example, and without limitation, a computing device 104 operated by a customer 106 of the service provider network 102 can be utilized to access the service provider network 102 by way of the network 802. It should be appreciated that a local-area network ("LAN"), the Internet, or any other networking topology known in the art that connects the data centers 800 to remote customers and other users can be utilized. It should also be appreciated that combinations of such networks can also be utilized.

Figure 9:
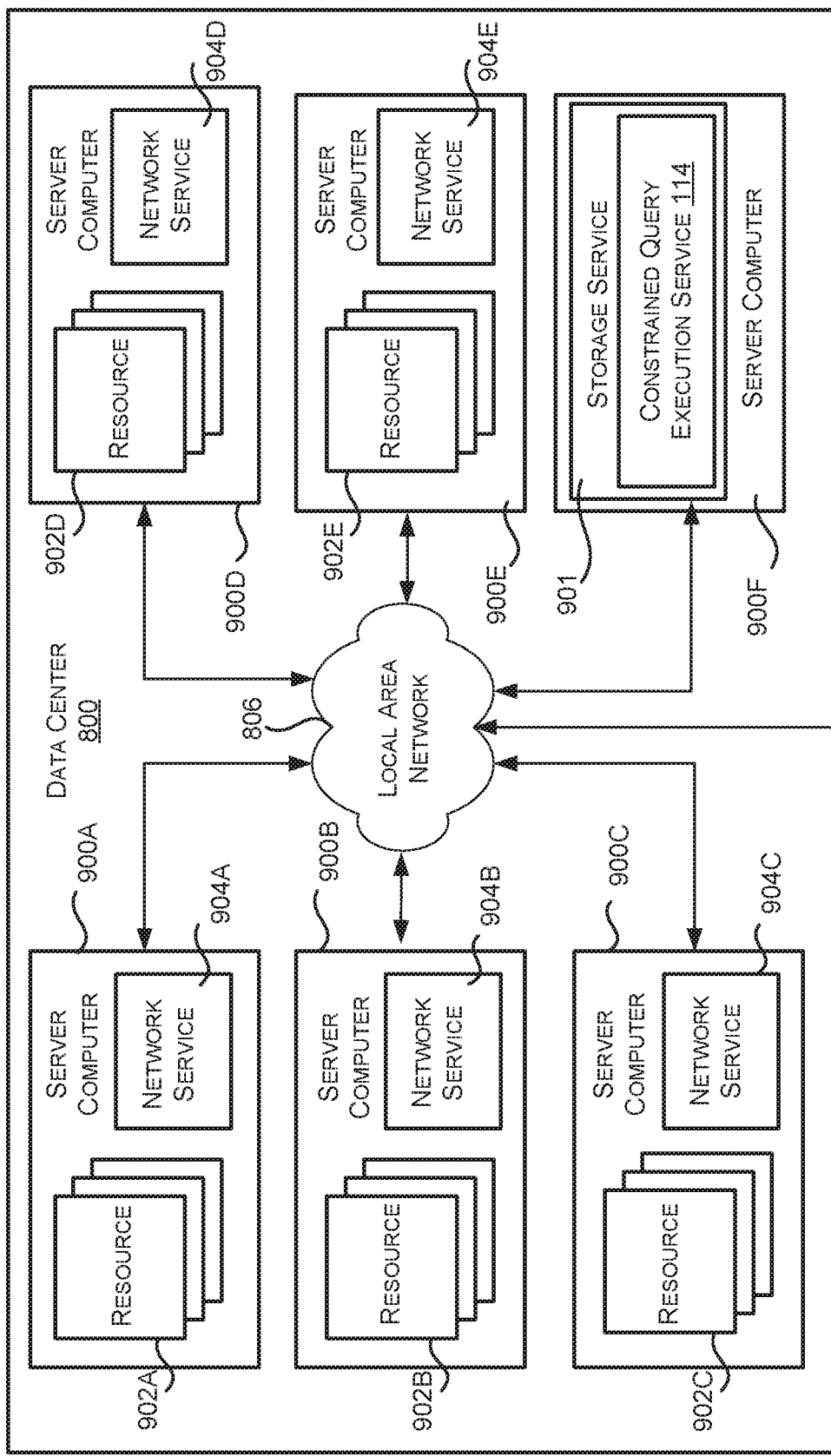
FIG. 9 is a computing system diagram illustrating a configuration for a data center that can be utilized to implement aspects of the technologies disclosed herein.

FIG. 9 is a computing system diagram that illustrates one configuration for a data center 800 that can be utilized to implement a storage service 901 of the network-based storage system 100 of FIG. 1, as well as the constrained query execution service 114, and the other network services disclosed herein. The example data center 800 shown in FIG. 9 includes several server computers 900A-900E (collectively 900) for providing the computing resources 902A-902E, respectively.

The server computers 900 can be standard tower, rackmount, or blade server computers configured appropriately for providing the various computing resources described herein (illustrated in FIG. 9 as the computing resources 902A-902E). As mentioned above, the computing resources 902 provided by the service provider network 102 can be data storage resources, data processing resources such as VM instances or hardware computing systems, database resources, networking resources, and others. Some of the servers 900 can also be configured to execute network services 904A-904E capable of instantiating, providing and/or managing the computing resources 902, some of which are described in detail herein.

The data center 800 shown in FIG. 9 also includes a server computer 900F that can execute some or all of the software components described above. For example, and without limitation, the server computer 900F can be configured to execute the storage service 901 of the network-based storage system 100, and the constrained query execution service 114 described in detail above. The server computer 900F can also be configured to execute other components and/or to store data for providing some or all of the functionality described herein. In this regard, it should be appreciated that components or different instances of the storage service 901 and the constrained query execution service 114 can execute on many other physical or virtual servers in the data centers 800 in various configurations.

In the example data center 800 shown in FIG. 9, an appropriate LAN 906 is also utilized to interconnect the server computers 900A-900F. The LAN 906 is also connected to the network 802 illustrated in FIG. 8. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 800(1)-(N), between each of the server computers 900A-900F in each data center 800, and, potentially, between computing resources 902 in each of the data centers 800. It should be appreciated that the configuration of the data center 800 described with reference to FIG. 9 is merely illustrative and that other implementations can be utilized.

Figure 10:
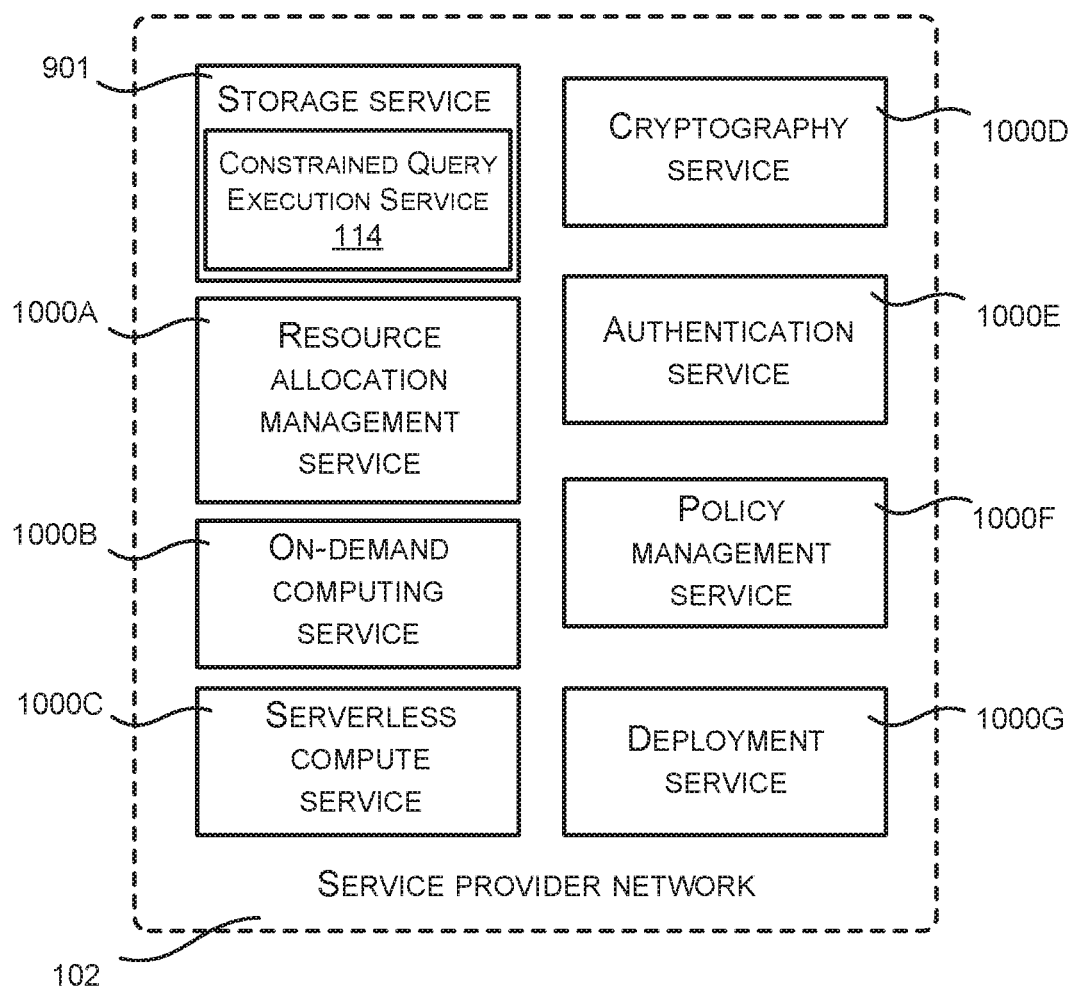
FIG. 10 is a network services diagram that shows aspects of several services that can be provided by and utilized within a service provider network configured to implement the various technologies disclosed herein.

FIG. 10 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, a storage service 901 of the network-based storage system 100 of FIG. 1, the constrained query execution service 114, a resource allocation management service 1000A, an on-demand computing service 1000B, a serverless compute service 1000C, a cryptography service 1000D, an authentication service 1000E, a policy management service 1000F, and a deployment service 1000G. The service provider network 102 can also provide other types of network services, some of which are described below. It is to be appreciated that the network-based storage system 100 described herein may be associated with any of these network-based services 1000, or any other network service in addition, or alternatively, to the network-based storage system 100 being associated with the storage service 901. In some cases, these other types of services 1000 and similar network services may be regarded as a "storage service" in that they manage the storage of data.

It is to be appreciated that users of the service provider network 102 can include organizations or individuals that utilize some or all of the network services provided by the service provider network 102. As described above, customers 106 can communicate with the service provider network 102 using an appropriate computing device 104 through a network, such as the network 802 shown in FIG. 8.

It is also noted that not all configurations described include the network services shown in FIG. 10 and that additional network services can be provided in addition to, or as an alternative to, the services explicitly described herein. Each of the services shown in FIG. 10 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 10 will now be provided.

The resource allocation management service 1000A may be configured to assist the work limiter 118 with the determination of a value for the unit of work for a given query execution request. For example, the resource allocation management service 1000A may be able to monitor the current workload across the entire system 100 and determine, for the work limiter 118, a value for the unit of work based on a parameter value (e.g., time of day, current workload on the system 100, etc.), as described elsewhere herein. This may be a dynamic determination or it may use a hybrid approach where the work limiter 118 starts with a static value for the unit of work, and the work limiter 118 queries the resource allocation management service 1000A to determine whether the static value is to be adjusted (e.g., up or down) based on any suitable factor(s), as described elsewhere herein.

The on-demand computing service 1000B can be a collection of computing resources configured to instantiate VM instances and to provide other types of computing resources 902 on demand. For example, a customer of the service provider network 102 can interact with the on-demand computing service 1000B (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a web site, to operate business applications or, generally, to serve as computing resources for the customer.

Other applications for the VM instances can be to support database applications, electronic commerce applications, business applications and/or other applications. Although the on-demand computing service 1000B is shown in FIG. 10, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The serverless compute service 1000C is a network service that allows customers to execute code (which might be referred to herein as a "function") without provisioning or managing server computers in the service provider network 102. Rather, the serverless compute service 1000C can automatically run code in response to the occurrence of events. The code that is executed can be stored by the storage service 901 or in another network accessible location.

In this regard, it is to be appreciated that the term "serverless compute service" as used herein is not intended to infer that servers are not utilized to execute the program code, but rather that the serverless compute service 1000C enables code to be executed without requiring a user to provision or manage server computers. The serverless compute service 1000C executes program code only when needed, and only utilizes the resources necessary to execute the code. In some configurations, the user or entity requesting execution of the code might be charged only for the amount of time required for each execution of their program code.

The service provider network 102 can also include a cryptography service 1000D. The cryptography service 1000D can utilize storage services of the service provider network 102, such as the storage service 901, to store encryption keys in encrypted form, whereby the keys can be usable to decrypt user keys accessible only to particular devices of the cryptography service 1000D. The cryptography service 1000D can also provide other types of functionality not specifically mentioned herein.

As illustrated in FIG. 10, the service provider network 102, in various configurations, also includes an authentication service 1000E and a policy management service 1000F. The authentication service 1000E, in one example, is a computer system (i.e., collection of computing resources 902) configured to perform operations involved in authentication of customers or users. For instance, one of the services shown in FIG. 10 can provide information from a customer of the authentication service 1000E to receive information in return that indicates whether or not the requests submitted by the customer are authentic.

The policy management service 1000F, in one example, is a network service configured to manage policies on behalf of customers of the service provider network 102. The policy management service 1000F can include an interface (e.g. API or GUI) that enables customers to submit requests related to the management of a policy, such as a security policy or an access policy. Such requests can, for instance, be requests to add, delete, change or otherwise modify a policy for a customer, service, or system, or for other administrative actions, such as providing an inventory of existing policies and the like.

The service provider network 102 can additionally maintain other network services based, at least in part, on the needs of its customers. For instance, the service provider network 102 can maintain a deployment service 1000G for deploying program code in some configurations. The deployment service 1000G provides functionality for deploying program code, such as to virtual or physical hosts provided by the on-demand computing service 1000B. Other services include, but are not limited to, database services, object-level archival data storage services, and services that manage, monitor, interact with, or support other services. The service provider network 102 can also be configured with other network services not specifically mentioned herein in other configurations.

Figure 11:
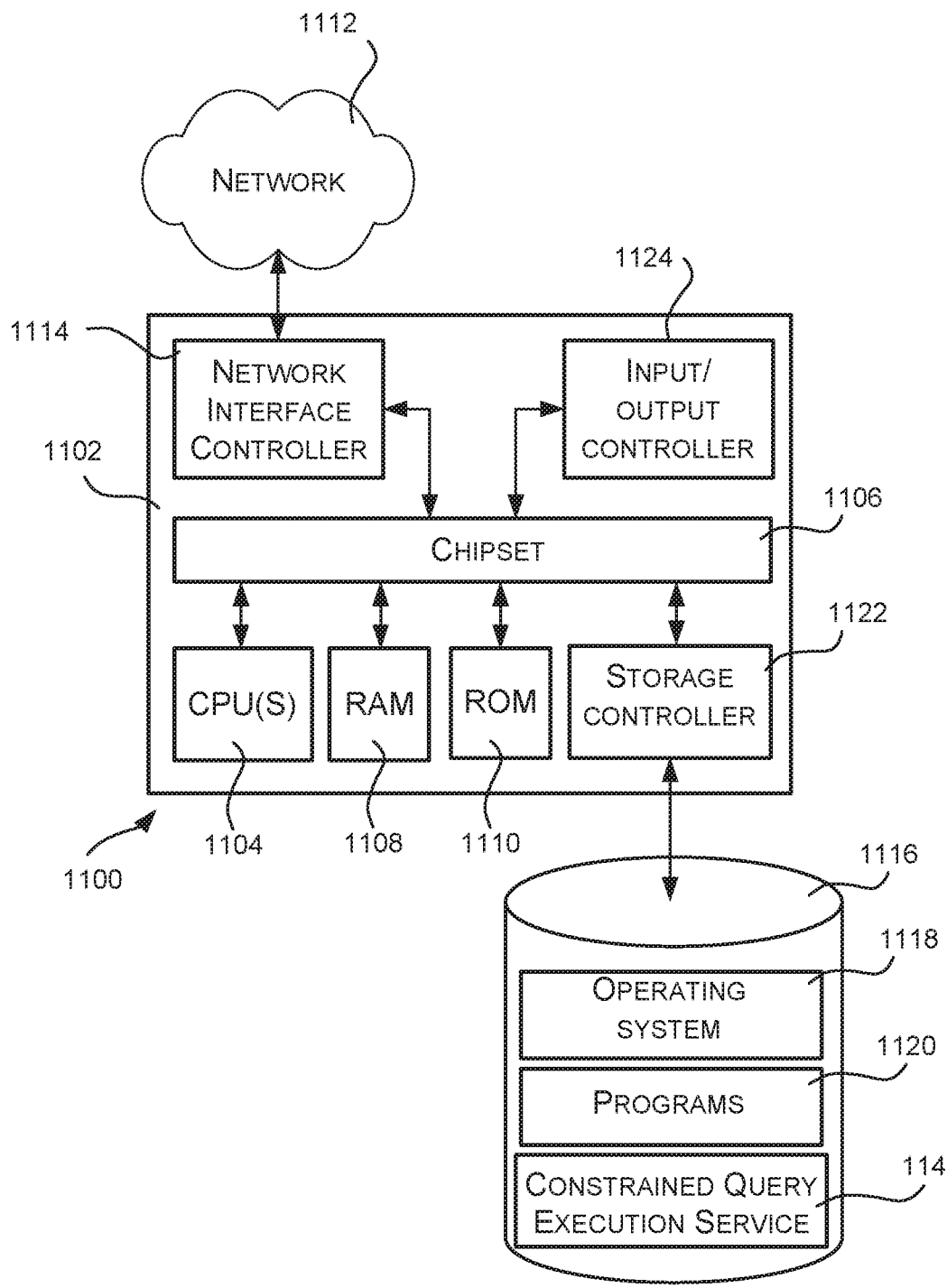
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1112. The chipset 1106 can include functionality for providing network connectivity through a NIC 1114, such as a gigabit Ethernet adapter. The NIC 1114 is capable of connecting the computer 1100 to other computing devices over the network 1112. It should be appreciated that multiple NICs 1114 can be present in the computer 1100, connecting the computer to other types of networks and remote computer systems.

The computer 1100 can be connected to a mass storage device 1116 that provides non-volatile storage for the computer. The mass storage device 1116 can store an operating system 1118, programs 1120, one or more components of the constrained query execution service 114, and data, which have been described in greater detail herein. The mass storage device 1116 can be connected to the computer 1100 through a storage controller 1122 connected to the chipset 1106. The mass storage device 1116 can consist of one or more physical storage units. The storage controller 1122 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1116 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1116 is characterized as primary or secondary storage, and the like.

For example, the computer 1100 can store information to the mass storage device 1116 by issuing instructions through the storage controller 1122 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1116 by detecting the physical states or characteristics of one or more particular locations within the physical storage units.

In addition to the mass storage device 1116 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1116 can store an operating system 1118 utilized to control the operation of the computer 1100. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1116 can store other system or application programs and data utilized by the computer 1100.

In one configuration, the mass storage device 1116 or other computer-readable storage media is encoded with computer-executable instructions which, when loaded into the computer 1100, transform the computer from a general-purpose computing system into a special-purpose computer capable of implementing the configurations described herein. These computer-executable instructions transform the computer 1100 by specifying how the CPUs 1104 transition between states, as described above. According to one configuration, the computer 1100 has access to computer-readable storage media storing computer-executable instructions which, when executed by the computer 1100, perform the various processes described above. The computer 1100 can also include computer-readable storage media storing executable instructions for performing any of the other computer-implemented operations described herein.

The computer 1100 can also include one or more input/output controllers 1124 for receiving and processing input from a number of input devices, such as a keyboard, a mouse, a touchpad, a touch screen, an electronic stylus, or other type of input device. Similarly, an input/output controller 1124 can provide output to a display, such as a computer monitor, a flat-panel display, a digital projector, a printer, or other type of output device. It is to be appreciated that the computer 1100 might not include all of the components shown in FIG. 11, can include other components that are not explicitly shown in FIG. 11, or can utilize an architecture completely different than that shown in FIG. 11.

Based on the foregoing, it should be appreciated that technologies for providing a network service capable of automatically evaluating and adjusting data security have been disclosed herein. Moreover, although the subject matter presented herein has been described in language specific to computer structural features, methodological acts, and computer readable media, it is to be understood that the appended claims are not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the following claims.

What is claimed is:

1. A network-based storage system comprising:
   one or more processors; and
   memory storing computer-executable instructions which, when executed by the one or more processors, cause the network-based storage system to:
     receive, at a time of day, from a computing device of a customer of the network-based storage system, a first application programming interface (API) call requesting to execute a query against data that is maintained by the network-based storage system;
     determine a value for a unit of work based on at least one of:
       the time of day being within or outside of a range of times; or
       a current workload of the network-based storage system at the time of day being less than or greater than a threshold,
     wherein the value for the unit of work represents at least one of: an allocated period of time, an allocated number of processor cycles, an allocated number of edges of a graph database, or an allocated number of pages of one or more files;
     limit execution of the query to the unit of work;
     initiate the execution of the query by progressing through a set of operations that are to be completed for completing the execution of the query;
     complete the unit of work to execute at least a portion of the query, wherein the unit of work is completed upon at least one of: executing the query for the allocated period of time, executing the query for the allocated number of processor cycles, traversing the allocated number of edges of the graph database during the execution of the query, or reading the allocated number of pages of the one or more files during the execution of the query;
     in response to completing the unit of work:
       pause the execution of the query;
       generate a token that encodes, or identifies, query state data indicative of a progress point within the set of operations; and
       send, to the computing device of the customer, the token and query results generated based on the execution of the query;
     receive, from at least one of the computing device of the customer or a different computing device of the customer, a second API call to resume the execution of the query, the second API call including the token;
     access the query state data using the token to determine the progress point; and
     resume the execution of the query from the progress point.

2. The network-based storage system of claim 1, wherein the computer-executable instructions, when executed by the one or more processors, further cause the network-based storage system to, after resuming the execution of the query from the progress point:
   complete an additional unit of work to execute the query; and
   in response to completing the additional unit of work:
     pause the execution of the query;
     generate a second token that encodes, or identifies, updated query state data indicative of an updated progress point within the set of operations; and
     send, to at least one of the computing device of the customer or the different computing device of the customer, the second token and additional query results generated based on the execution of the query.

3. The network-based storage system of claim 2, wherein the value for the unit of work is a first value, and wherein the computer-executable instructions, when executed by the one or more processors, further cause the network-based storage system to:
   determine a second value for the additional unit of work, the second value being different than the first value and based at least in part on at least one of:
     a second time of day at which the second API call is received; or
     a second current workload of the network-based storage system at the second time of day.

4. A computer-implemented method comprising:
   receiving, at a time of day, from a computing device of a customer, a request to execute a query against data that is maintained by a network-based storage system;
   determining a value for a unit of work based at least in part on at least one of:
     the time of day being within or outside of a range of times; or
     a current workload of the network-based storage system at the time of day being less than or greater than a threshold;
   performing the unit of work to execute at least a portion of the query, wherein the query is executed by progressing through a set of operations that are to be completed for completing execution of the query; and
   based at least in part on completion of the unit of work:
     pausing the execution of the query;
     generating a token that includes, or identifies, query state data indicative of a progress point within the set of operations;
     generating query results based at least in part on the execution of the query; and
     sending the token to the computing device of the customer.

5. The computer-implemented method of claim 4, wherein the unit of work is completed upon at least one of:
   executing the query for a period of time, the value for the unit of work representing the period of time;
   executing the query for a number of processor cycles, the value for the unit of work representing the number of processor cycles;
   traversing a number of edges of a graph database during the execution of the query, the value for the unit of work representing the number of edges of the graph database; or
   reading a number of pages of one or more files during the execution of the query, the value for the unit of work representing the number of pages of the one or more files.

6. The computer-implemented method of claim 4, wherein the token comprises an execution token that includes the query state data.

7. The computer-implemented method of claim 6, further comprising:
   receiving, from at least one of the computing device of the customer or a different computing device of the customer, a second request to resume the execution of the query, the second request including the execution token;
   extracting the query state data from the execution token to determine the progress point;
   resuming the execution of the query from the progress point;
   performing an additional unit of work to execute the query; and based at least in part on completion of the additional unit of work:
   pausing the execution of the query;
   generating a second execution token that includes updated query state data indicative of an updated progress point within the set of operations;
   generating additional query results based at least in part on the execution of the query; and
   sending the second execution token to at least one of the computing device or the different computing device of the customer.

8. The computer-implemented method of claim 4, further comprising storing the query state data in memory accessible to the network-based storage system.

9. The computer-implemented method of claim 8, wherein the token comprises a representative token that identifies the query state data but does not include the query state data.

10. The computer-implemented method of claim 9, further comprising:
   receiving, from at least one of the computing device of the customer or a different computing device of the customer, a second request to resume the execution of the query, the second request including the representative token, and
   using the representative token to identify, in the memory accessible to the network-based storage system, the query state data;
   determining the progress point based at least in part on the query state data;
   resuming the execution of the query from the progress point;
   performing an additional unit of work to execute the query; and
   based at least in part on completion of the additional unit of work:
   pausing the execution of the query;
   generating a second representative token that identifies updated query state data indicative of an updated progress point within the set of operations;
   generating additional query results based at least in part on the execution of the query; and
   sending the second representative token to at least one of the computing device or the different computing device of the customer.

11. The computer-implemented method of claim 10, wherein the value for the unit of work is a first value, the computer-implemented method further comprising:
   determining a second value for the additional unit of work, the second value being different than the first value and based at least in part on at least one of:
   a second time of day at which the second request is received; or
   a second current workload of the network-based storage system at the second time of day.

12. The computer-implemented method of claim 4, wherein the query is executed against a graph database that includes a plurality of nodes and a plurality of edges, each edge connecting a pair of the nodes, wherein the nodes represent the data that is maintained by the network-based storage system.

13. The computer-implemented method of claim 4, further comprising, after the generating of the query results, and prior to receiving a second request to resume the execution of the query:
   determining to resume the execution of the query, without user intervention, based at least in part on at least one of a second time of day or a second current workload of the network-based storage system; and
   resuming the execution of the query without the user intervention.

14. The computer-implemented method of claim 4, further comprising sending the query results to the computing device of the customer.

15. A network-based storage system comprising:
   one or more processors; and
   memory storing computer-executable instructions which, when executed by the one or more processors, cause the network-based storage system to:
   receive, at a time of day, from a computing device of a customer, a request to execute a query against data that is maintained by the network-based storage system;
   determine a value for a unit of work based at least in part on at least one of:
   the time of day being within or outside of a range of times; or
   a current workload of the network-based storage system at the time of day being less than or greater than a threshold;
   perform the unit of work to execute at least a portion of the query, wherein the query is executed by progressing through a set of operations that are to be completed for completing execution of the query; and
   based at least in part on completion of the unit of work:
   pause the execution of the query;
   generate a token that includes, or identifies, query state data indicative of a progress point within the set of operations;
   generate query results based at least in part on the execution of the query; and
   send the token to the computing device of the customer.

16. The network-based storage system of claim 15, wherein the token comprises an execution token that includes the query state data.

17. The network-based storage system of claim 16, wherein the computer-executable instructions, when executed by the one or more processors, further cause the network-based storage system to:
receive, from at least one of the computing device of the customer or a different computing device of the customer, a second request to resume the execution of the query, the second request including the execution token;
extract the query state data from the execution token to determine the progress point;
resume the execution of the query from the progress point;
perform a second unit of work to execute the query; and
based at least in part on completion of the second unit of work:
pause the execution of the query;
generate a second execution token that includes second query state data indicative of a second progress point within the set of operations;
generate second query results based at least in part on the execution of the query; and
send the second execution token to at least one of the computing device or the different computing device of the customer.

18. The network-based storage system of claim 15, wherein the computer-executable instructions, when executed by the one or more processors, further cause the network-based storage system to, after generating the query results, and prior to receiving a second request to resume the execution of the query:
determine to resume the execution of the query, without user intervention, based at least in part on at least one of a second time of day or a second current workload of the network-based storage system; and
resume the execution of the query without the user intervention.

19. The network-based storage system of claim 15, wherein the computer-executable instructions, when executed by the one or more processors, further cause the network-based storage system to:
receive, at a second time of day, from at least one of the computing device of the customer or a different computing device of the customer, a second request to resume the execution of the query, the second request including the token; and
determine a second value for the additional unit of work, the second value being different than the first value and based at least in part on at least one of:
the second time of day being within or outside of the range of times; or
a second current workload of the network-based storage system at the second time of day being less than or greater than the threshold.

20. The network-based storage system of claim 15, wherein the unit of work is completed upon at least one of:
executing the query for a period of time, the value for the unit of work representing the period of time;
executing the query for a number of processor cycles, the value for the unit of work representing the number of processor cycles;
traversing a number of edges of a graph database during the execution of the query, the value for the unit of work representing the number of edges of the graph database; or
reading a number of pages of one or more files during the execution of the query, the value for the unit of work representing the number of pages of the one or more files.

21. The network-based storage system of claim 15, wherein the token comprises a representative token that identifies the query state data but does not include the query state data.

* * * * *